US012591078B2

(12) United States Patent (10) Patent No.: US 12,591,078 B2
Ochi et al. (45) Date of Patent: Mar. 31, 2026

(54) INFORMATION PROCESSING APPARATUS, RADAR APPARATUS, METHOD, AND STORAGE MEDIUM

(71) Applicant: KABUSHIKI KAISHA TOSHIBA, Tokyo (JP)

(72) Inventors: Shota Ochi, Yokohama Kanagawa (JP); Noritsugu Shiokawa, Yokohama Kanagawa (JP); Yoshimasa Egashira, Kawasaki Kanagawa (JP); Masakazu Wada, Yokohama Kanagawa (JP); Tetsuya Kobayashi, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 323 days.

(21) Appl. No.: 18/181,752

(22) Filed: Mar. 10, 2023

(65) Prior Publication Data

US 2024/0094434 A1 Mar. 21, 2024

(30) Foreign Application Priority Data

Sep. 15, 2022 (JP) ................................. 2022-146933

(51) Int. Cl.
| | |
|---|---|
| *G01W 1/10* | (2006.01) |
| *G01S 13/95* | (2006.01) |
| *G01W 1/02* | (2006.01) |
| *G01W 1/14* | (2006.01) |

(52) U.S. Cl.
CPC .............. *G01W 1/10* (2013.01); *G01S 13/95* (2013.01); *G01W 1/02* (2013.01); *G01W 1/14* (2013.01)

(58) Field of Classification Search
None
See application file for complete search history.

(56) References Cited

U.S. PATENT DOCUMENTS

2004/0094434 A1* 5/2004 Ahmed .................... A45C 1/10
206/0.83
2017/0175432 A1* 6/2017 Dervitsiotis ............... B60J 1/12

FOREIGN PATENT DOCUMENTS

| JP | 2006030013 A | 2/2006 |
|---|---|---|
| JP | 4369816 B2 | 9/2009 |
| JP | 2010164383 A | 7/2010 |

OTHER PUBLICATIONS

Tsuchiya, et al., "Improvement of the Radar Rainfall Accuracy of Xrain By Modifying of Rainfall Attenuation Correction and Compositing Radar Rainfall", Journal of Japan Society of Civil Engineers, Ser. B1 (Hydraulic Engineering) (vol. 71, No. 4), 2015, pp. I_457-I_462.

* cited by examiner

*Primary Examiner* — Matthew G Marini
(74) *Attorney, Agent, or Firm* — Holtz, Holtz & Volek PC

(57) ABSTRACT

According to one embodiment, an information processing apparatus includes a processing circuitry. The processing circuitry is configured to acquire first and second weather data in a first time zone and ground rainfall amount data, acquire, based on the first and second weather data, first feature values, generate learning data based on the ground rainfall amount data and the first feature values, generate, based on the learning data, a learned model, acquire first and second weather data in a second time zone, acquire, based on the first and second weather data, second feature values, acquire a parameter output from the learned model by inputting the plurality of second feature values, and generate, based on the parameter, composite rainfall amount data.

14 Claims, 17 Drawing Sheets

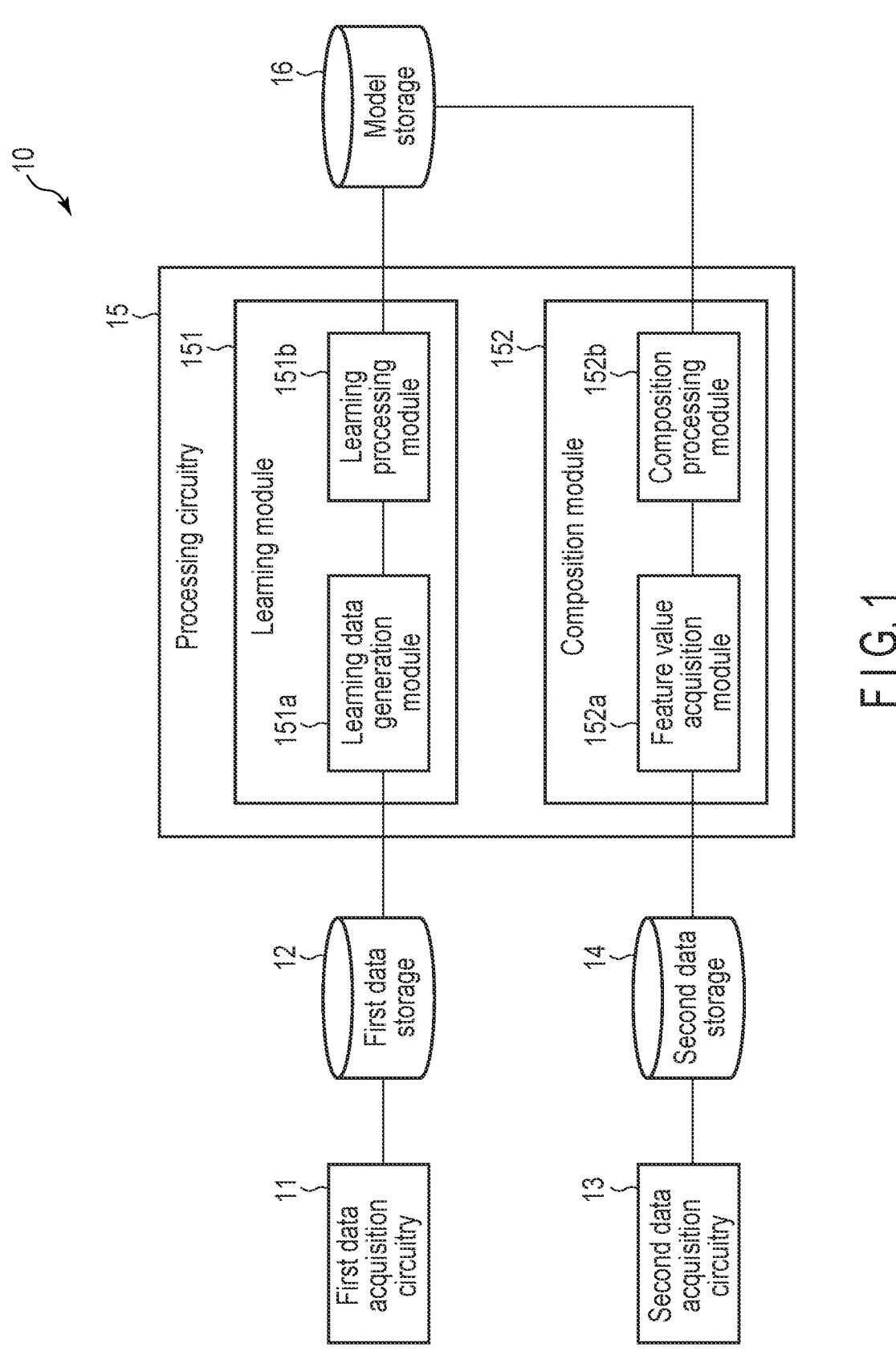
F I G. 1

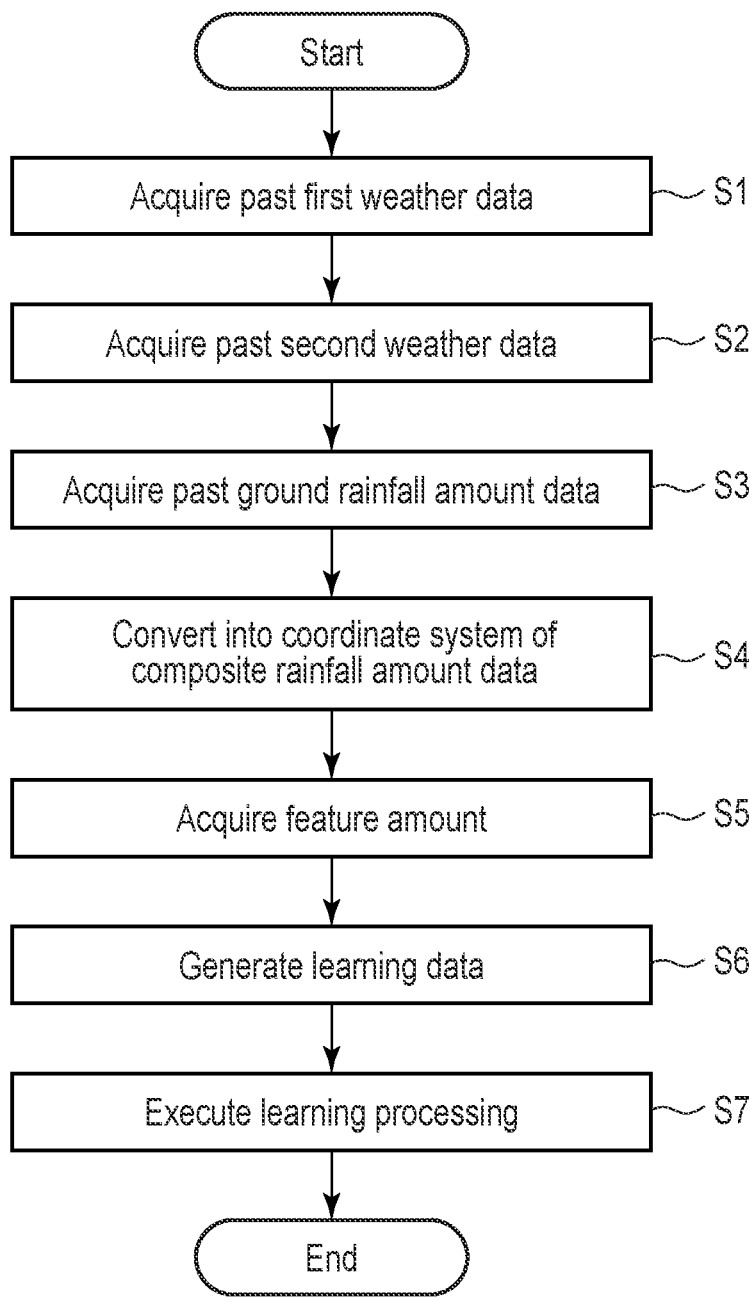
F I G. 3

| | RMSE [mm/h] |
|---|---|
| Comparative example | 3.8 |
| First embodiment | 3.2 |

| | RMSE [mm/h] |
|---|---|
| Comparative example | 3.8 |
| Modification of first embodiment | 3.0 |

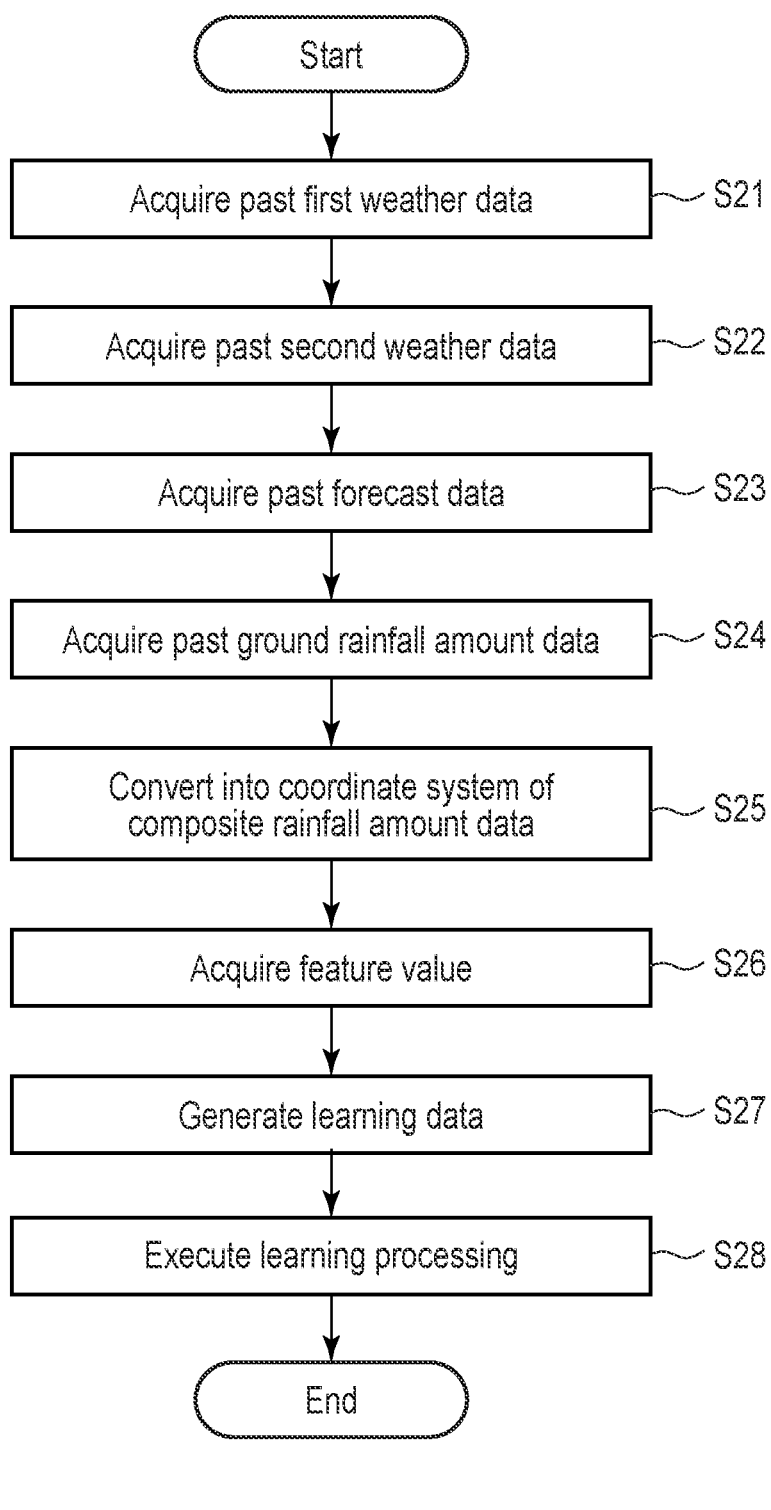
F I G. 8

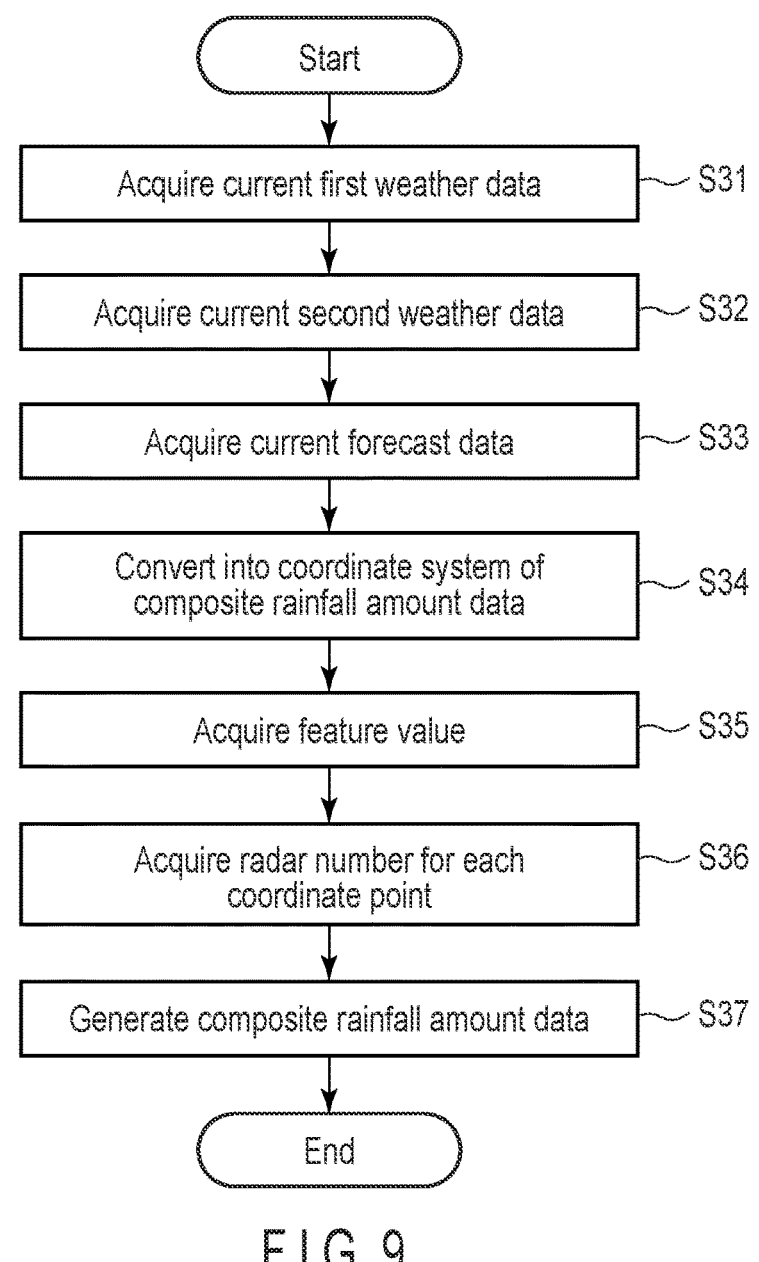

Start

Acquire current first weather data ～ S31

Acquire current second weather data ～ S32

Acquire current forecast data ～ S33

Convert into coordinate system of composite rainfall amount data ～ S34

Acquire feature value ～ S35

Acquire radar number for each coordinate point ～ S36

Generate composite rainfall amount data ～ S37

End

F I G. 9

| | RMSE [mm/h] | | |
|---|---|---|---|
| | Local heavy rain | Typhoon | Weather front |
| Comparative example | 3.5 | 3.8 | 2.0 |
| Second embodiment | 3.2 | 3.0 | 1.7 |

F I G. 10

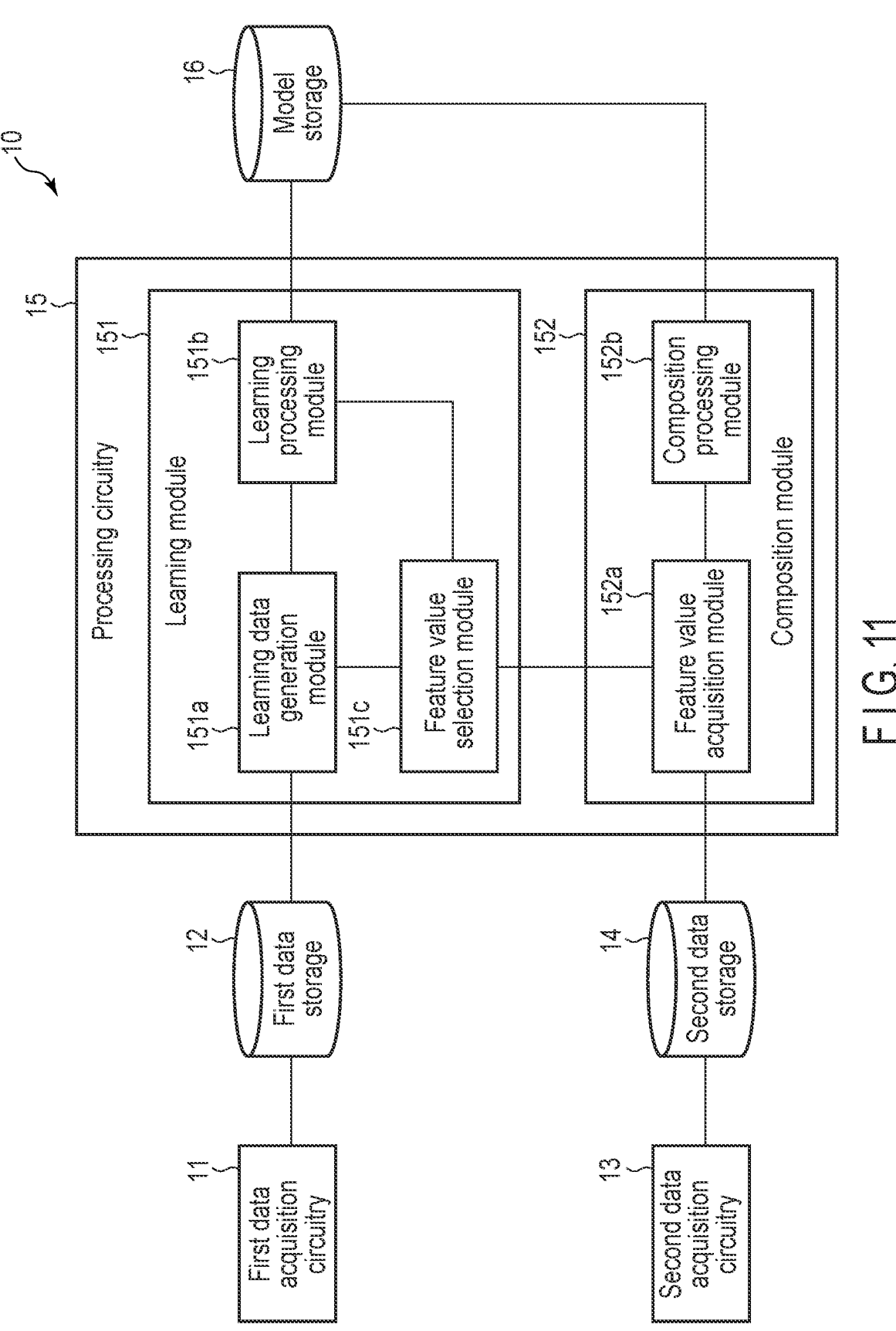
F I G. 11

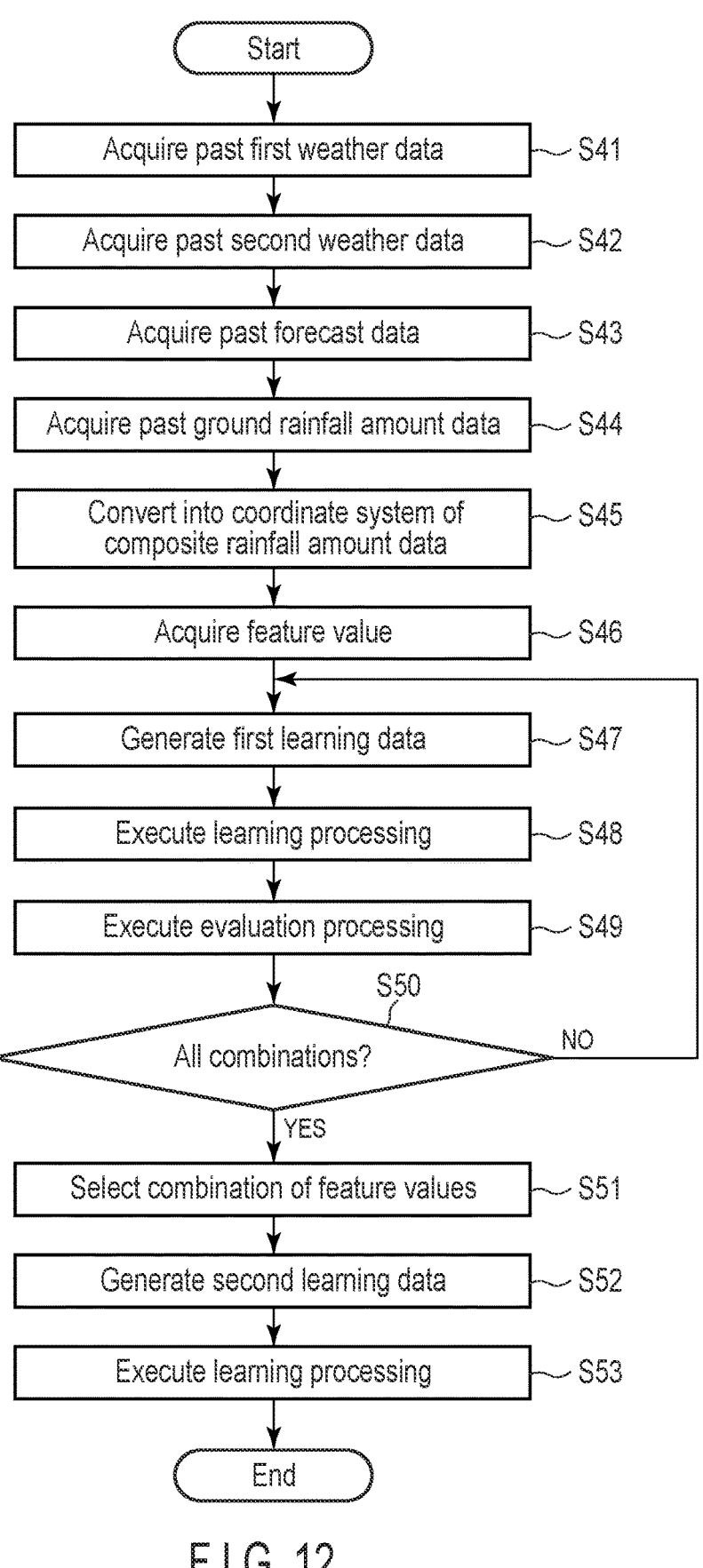
F I G. 12

| | RMSE [mm/h] | | |
|---|---|---|---|
| | Local heavy rain | Typhoon | Weather front |
| Comparative example | 3.5 | 3.8 | 2.0 |
| Second embodiment | 3.2 | 3.0 | 1.7 |
| Third embodiment | 3.0 | 2.6 | 1.6 |

F I G. 13

| Classification | Feature values | Number |
|---|---|---|
| Weather data | • Radar rainfall amount value<br>• Distance between weather radar and coordinate point<br>• Integrated value of rainfall attenuation<br>• Flag value of calculation method of radar rainfall amount value<br>• Observation altitude<br>• Spatial average value, standard deviation, and maximum value of radar rainfall amount values<br>• Ratio of coordinate points at which rainfall is observed | 9 |
| External rainfall amount data | • Composite rainfall amount value<br>• Spatial average value, standard deviation, and maximum value of composite rainfall amount values<br>• Ratio of coordinate points at which rainfall is observed<br>• Distance between each of plurality of weather radars that have observed radar rainfall amount that is basis and coordinate point<br>• Average value of distances between each of plurality of weather radars that have observed radar rainfall amount that is basis and coordinate point | 11 |
| Difference between weather data and external rainfall amount data | • Difference in rainfall amount value<br>• Difference in distance of coordinate point<br>• Difference in spatial average value, standard deviation, and maximum value of rainfall amount values<br>• Difference in ratio of coordinate points at which rainfall is observed | 6 |
| Forecast data (ground surface) | • Air temperature<br>• Sea surface calibration atmospheric pressure<br>• Absolute value of horizontal wind speed<br>• Cloud amount (lower layer, middle layer, and upper layer) | 6 |
| Forecast data (atmospheric pressure surface) | • Ascending air current, air temperature, altitude, absolute value of horizontal wind speed, and relative humidity of 850 hPa surface<br>• Ascending air current, air temperature, altitude, absolute value of horizontal wind speed, and relative humidity of 700 hPa surface<br>• Ascending air current, air temperature, altitude, absolute value of horizontal wind speed, and relative humidity of 500 hPa surface | 15 |
| Forecast data (difference between atmospheric pressure surfaces) | • Difference between ascending air currents, air temperatures, altitudes, absolute values of horizontal wind speeds, and relative humidities of 850 hPa surface and 700 hPa surface<br>• Difference between ascending air currents, air temperatures, altitudes, absolute values of horizontal wind speeds, and relative humidities of 850 hPa surface and 500 hPa surface | 10 |
| Total | | 57 |

F I G. 15

| Classification | Feature value | Importance level [%] |
|---|---|---|
| Weather data | Radar rainfall amount value | 7.3 |
| | Distance between weather radar and coordinate point | 3.4 |
| | Integrated value of rainfall attenuation amount | 4.6 |
| | Flag value of calculation method of radar rainfall amount value | 5.2 |
| | Composite rainfall amount value | 7.2 |
| External rainfall amount data | Spatial average value of composite rainfall amount values | 4.8 |
| | Ratio of coordinate points at which rainfall is observed | 3.3 |
| | Average value of distances between each of plurality of weather radars that have observed radar rainfall amount that is basis and coordinate point | 4.1 |
| Difference between weather data and external rainfall amount data | Rainfall amount value | 15.3 |
| Forecast data (ground surface) | Sea surface calibration atmospheric pressure | 5.3 |
| | Absolute value of horizontal wind speed | 4.7 |
| | Cloud amount (lower layer) | 7.3 |
| Forecast data (atmospheric pressure surface) | Ascending air current of 700 hPa surface | 6.2 |
| Forecast data (difference between atmospheric pressure surfaces) | Difference between temperature ascending air currents of 850 hPa surface and 700 hPa surface | 5.1 |
| | Difference between temperatures of 850 hPa surface and 700 hPa surface | 5.7 |
| | Difference between absolute values of horizontal wind speeds of 850 hPa surface and 700 hPa surface | 4.6 |
| | Difference between relative humidities of 850 hPa surface and 700 hPa surface | 5.8 |

F I G. 16

|  | | | RMSE [mm/h] | | | | | |
|---|---|---|---|---|---|---|---|---|
|  | | | Local heavy rain 1 | Local heavy rain 2 | Typhoon 1 | Typhoon 2 | Weather front 1 | Weather front 2 |
| Weather data | | | 8.1 | 5.1 | 5.8 | 8.9 | 3.3 | 2.5 |
| External rainfall amount data | | | 6.2 | 4.0 | 3.5 | 5.7 | 2.6 | 1.9 |
| Fourth embodiment | | Random forest | 4.8 | 4.3 | 3.4 | 5.7 | 2.2 | 1.5 |
|  | | Support vector machine | 5.8 | 3.9 | 3.4 | 5.3 | 2.1 | 1.5 |
|  | | Gradient boosting decision tree | 5.5 | 4.0 | 3.4 | 5.5 | 2.1 | 1.5 |

FIG. 18

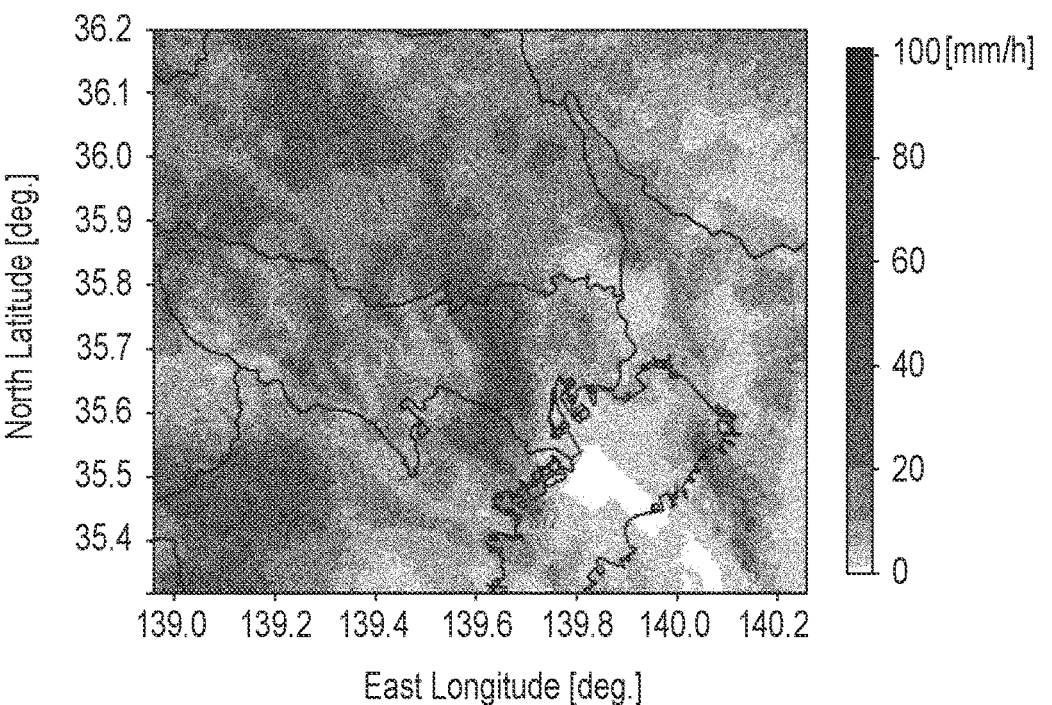
F I G. 19
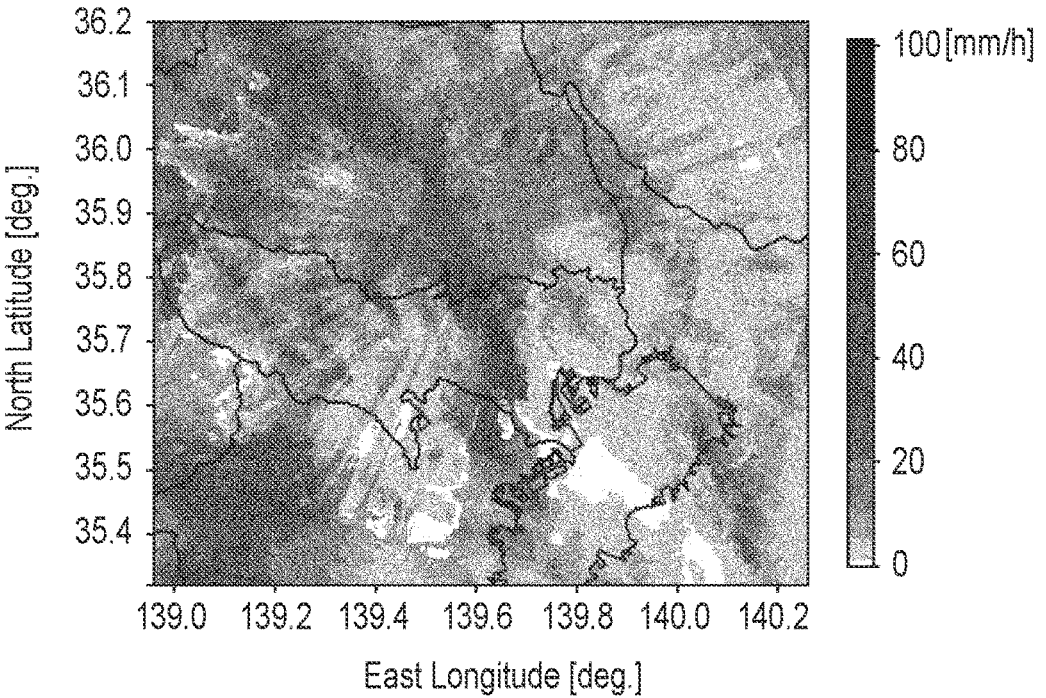
F I G. 20

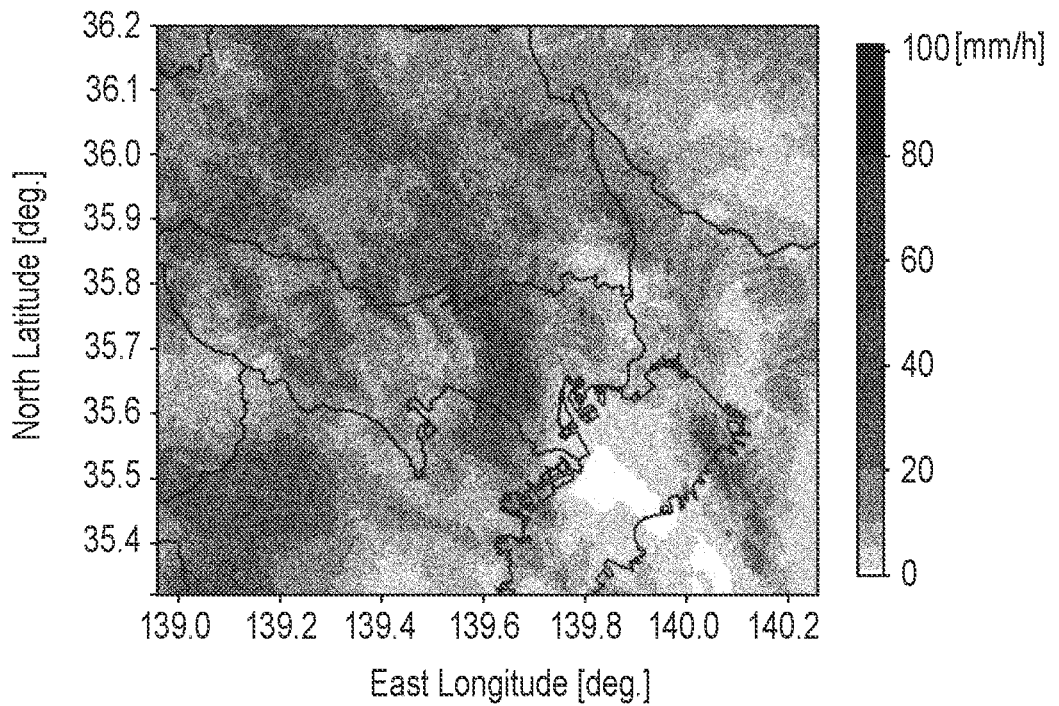
F I G. 21
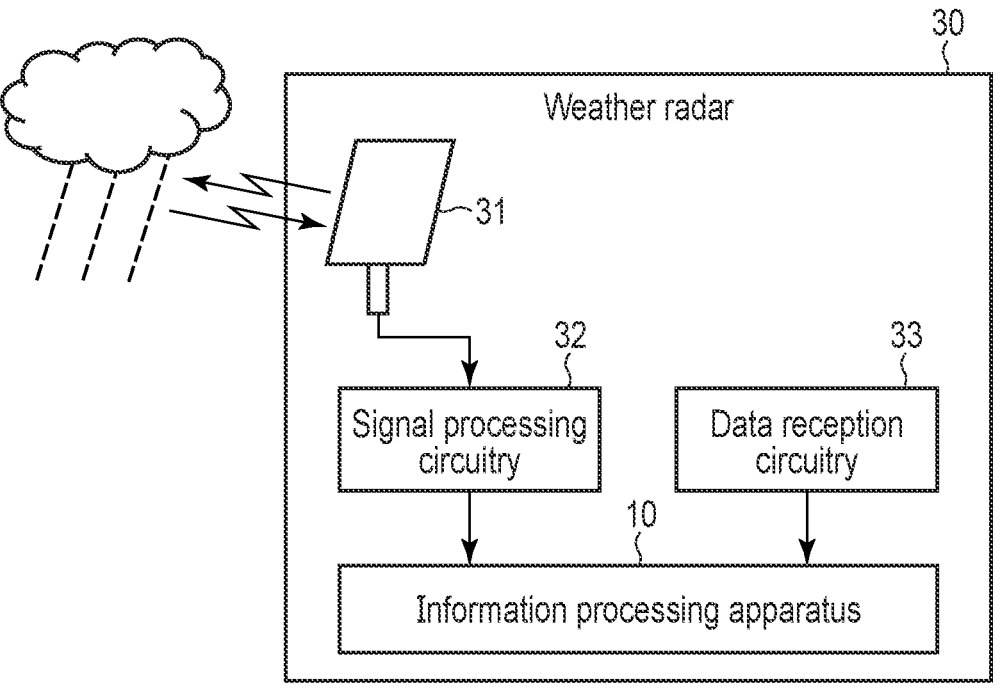
F I G. 22

INFORMATION PROCESSING APPARATUS, RADAR APPARATUS, METHOD, AND STORAGE MEDIUM

CROSS-REFERENCE TO RELATED APPLICATIONS

This application is based upon and claims the benefit of priority from Japanese Patent Application No. 2022-146933, filed Sep. 15, 2022, the entire contents of which are incorporated herein by reference.

FIELD

Embodiments described herein relate generally to an information processing apparatus, a radar apparatus, a method, and a storage medium.

BACKGROUND

In recent years, damage caused by a local weather phenomenon such as torrential rain has increased, and it is known to use a weather radar for early detection of the local weather phenomenon. The weather radar is a radar apparatus (weather observation apparatus) capable of observing a rainfall amount value (rainfall amount) or the like by using a reflected wave received by an antenna when a radio wave transmitted (emitted) from the antenna is reflected by raindrops. In such a weather radar, it is possible to realize high temporal resolution and spatial resolution as compared with a ground rainfall meter generally used to measure a rainfall amount value.

Meanwhile, the observation range of the weather radar alone is limited. In addition, the rainfall amount value observed by the weather radar includes an error. For this reason, rainfall amount values observed by a plurality of weather radars are composed, thereby generating composite rainfall amount data having a wide range and high reliability.

However, unless the rainfall amount values observed by the plurality of weather radars are appropriately composed, it is not possible to generate highly accurate composite rainfall amount data.

BRIEF DESCRIPTION OF THE DRAWINGS

FIG. 1 is a block diagram illustrating an example of a configuration of an information processing apparatus according to a first embodiment.

FIG. 3 is a flowchart illustrating an example of a processing procedure of model generation processing.

FIG. 8 is a flowchart illustrating an example of a processing procedure of model generation processing according to a second embodiment.

FIG. 9 is a flowchart illustrating an example of a processing procedure of composite rainfall amount data generation processing.

FIG. 10 is a diagram illustrating accuracy of composite rainfall amount data generated in the present embodiment.

FIG. 11 is a block diagram illustrating an example of a configuration of an information processing apparatus according to a third embodiment.

FIG. 12 is a flowchart illustrating an example of a processing procedure of model generation processing.

FIG. 13 is a diagram illustrating accuracy of composite rainfall amount data generated in the present embodiment.

FIG. 15 is a diagram illustrating a list of feature values acquired in the model generation processing.

FIG. 16 is a diagram illustrating an example of a combination of feature values selected in the model generation processing.

FIG. 18 is a diagram illustrating accuracy of composite rainfall amount data generated in the present embodiment.

FIG. 19 is a diagram illustrating a display example of composite rainfall amount data to which a random forest is applied.

FIG. 20 is a diagram illustrating a display example of composite rainfall amount data to which a support vector machine is applied.

FIG. 21 is a diagram illustrating a display example of composite rainfall amount data to which a gradient boosting decision tree is applied.

FIG. 22 is a diagram illustrating an example of a configuration of a weather radar according to a fifth embodiment.

DETAILED DESCRIPTION

Figure 2:
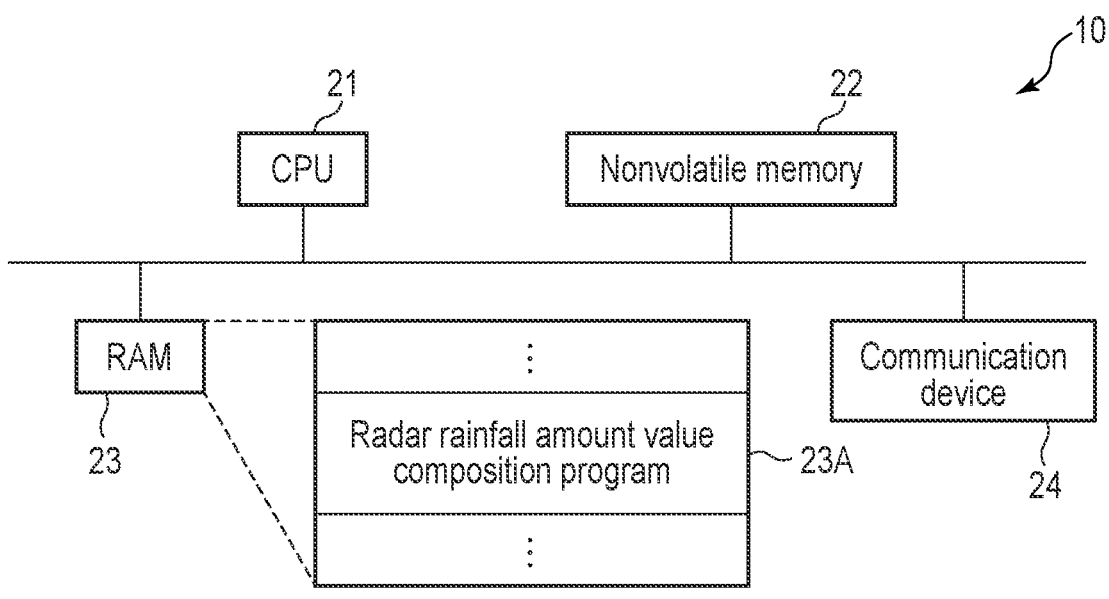
FIG. 2 is a diagram illustrating an example of a system configuration of the information processing apparatus.

In general, according to one embodiment, an information processing apparatus includes a processing circuitry. The processing circuitry is configured to: acquire first weather data in a first time zone including a first radar rainfall amount value observed in the first time zone in a first weather radar, second weather data in the first time zone including a second radar rainfall amount value observed in the first time zone in a second weather radar different from the first weather radar, and ground rainfall amount data in the first time zone including a ground rainfall amount value measured in the first time zone in a ground rainfall meter; acquire, based on the first and second weather data in the first time zone, a plurality of first feature values related to accuracy of the first and second radar rainfall amount values included in the first and second weather data in the first time zone; generate learning data based on the ground rainfall amount value included in the ground rainfall amount data in the first time zone and the plurality of acquired first feature values; generate, based on the generated learning data, a learned model learned so as to output a parameter for estimating a rainfall amount value corresponding to the ground rainfall amount value included in the ground rainfall amount data in the first time zone when the plurality of first feature values are input; acquire first weather data in a second time zone including a first radar rainfall amount value observed in the second time zone after the first time zone in the first weather radar and second weather data in the second time zone including a second radar rainfall amount value observed in the second time zone in the second weather radar; acquire, based on the first and second weather data in the second time zone, a plurality of second feature values related to accuracy of the first and second radar rainfall amount values included in the first and second weather data in the second time zone; acquire a parameter output from the learned model by inputting the plurality of acquired second feature values to the generated learned model; and compose, based on the acquired parameter, the first and second radar rainfall amount values included in the first and second weather data in the second time zone to generate composite rainfall amount data.

Various embodiments will be described with reference to the accompanying drawings.

First Embodiment

First, a first embodiment will be described. An information processing apparatus (radar rainfall amount value composing apparatus) according to the present embodiment is applied to a weather radar system including a plurality of weather radars (pieces of radar apparatus) capable of observing a rainfall amount value or the like based on a reflected wave (signal) received by an antenna (receiver) as a radio wave transmitted from the antenna (transmitter) is reflected by raindrops, and is used to generate composite rainfall amount data in a wide range and with high reliability by composing rainfall amount values (hereinafter, referred to as radar rainfall amount value) observed by each of the plurality of weather radars.

Here, composite rainfall amount data generated in a comparative example of the present embodiment will be briefly described. In the comparative example of the present embodiment, in order to generate highly accurate composite rainfall amount data from radar rainfall amount values observed by each of the plurality of weather radars, for example, a method is adopted in which the weight of the radar rainfall amount value observed by the weather radar under the condition that observation accuracy is estimated to be relatively high is increased and weighted averaging is performed. In addition, in the comparative example of the present embodiment, for example, a method of determining the priority order of the weather radars based on a plurality of feature values related to accuracy of the radar rainfall amount value and selecting the radar rainfall amount value observed by the weather radar with a high priority order may be adopted.

It is noted that the observation accuracy of the weather radar (accuracy of radar rainfall amount value) varies complicatedly depending on, for example, a type of the weather radar that varies depending on the used frequency (C-band/X-band), polarization (single polarization/double polarization), an antenna shape (parabolic type/phased array type), a transmitter type (solid-state element type/electron tube type), and the like, specifications of the weather radar apparatus (transmission power, antenna gain, minimum reception sensitivity, and the like), observation sequence (number of pulse hits, antenna rotation speed, and the like), signal processing specifications (interference removal method, clutter removal method, and the like), geographical conditions (distance, altitude, shielding, and the like), meteorological conditions (particle size distribution, particle type, rainfall distribution, and the like of raindrops), and combinations thereof.

That is, there are a large number of feature values that directly or indirectly affect the observation accuracy of the weather radar, and the composite rainfall amount data is preferably generated in consideration of the large number of feature values.

However, a combination of feature values used to generate the composite rainfall amount data in the comparative example of the present embodiment, coefficient and thresholds applied to the feature values, and the like are set (determined) by a designer of an algorithm related to composition of radar rainfall amount values.

In this case, it is sufficient for the designer to be able to determine appropriate feature values, coefficients, thresholds, and the like in order to generate highly accurate composite rainfall amount data, but it is difficult for the designer to analyze all of the above-described large number of feature values and determine appropriate feature-values, coefficients, thresholds, and the like.

Therefore, in the comparative example of the present embodiment, for example, the composite rainfall amount data is generated in consideration of only one to four limited feature values, and a large number of feature values related to the observation accuracy of the weather radar cannot be sufficiently utilized.

Furthermore, in recent years, since various types of weather radars are operated by various organizations, it is necessary to accurately compose radar rainfall amount values observed by such weather radars. However, when a type of the weather radar or an organization operating the weather radar is different, there are many cases where there is a difference in the type and quality of the feature value described above, and it is very difficult to extend the method adopted in the comparative example of the present embodiment described above to various combinations of the type of the weather radar or the organization operating the weather radar.

Therefore, the present embodiment provides an information processing apparatus capable of composing (that is, generating composite rainfall amount data) radar rainfall amount values observed by a plurality of weather radars in consideration of a large number of feature values related to observation accuracy of the weather radar (accuracy of radar rainfall amount values).

Hereinafter, the information processing apparatus according to the present embodiment will be described. FIG. 1 is a block diagram illustrating an example of a configuration of an information processing apparatus according to the present embodiment.

As illustrated in FIG. 1, an information processing apparatus 10 includes a first data acquisition circuitry 11, first data storage 12, a second data acquisition circuitry 13, second data storage 14, a processing circuitry 15, and model storage 16.

In the present embodiment, it is assumed that first and second weather radars are prepared as a plurality of weather radars, and the information processing apparatus 10 has a function of generating composite rainfall amount data by composing a radar rainfall amount value observed by the first weather radar and a radar rainfall amount value observed by the second weather radar. It is noted that the first and second weather radars in the present embodiment may be the same type of weather radar or may be different types of weather radars.

It is noted that, in the present embodiment, as described later, a configuration is adopted in which radar rainfall amount values are composed using a learned model generated by applying a predetermined machine learning algorithm.

The first data acquisition circuitry 11 acquires data for generating a learned model. Specifically, the first data acquisition circuitry 11 acquires weather data (hereinafter, referred to as past first weather data) including a radar rainfall amount value observed in the past (first time zone) in the first weather radar. It is noted that the first weather radar is configured to observe radar rainfall amount values at a plurality of points included in the observation range of the first weather radar. Hereinafter, a plurality of points (that is, point where first weather radar can observe radar rainfall amount value) included in the observation range of the first weather radar will be conveniently referred to as observation points of the first weather radar. It is noted that the past first weather data includes radar rainfall amount values observed at each of the plurality of observation points of the first weather radar.

In addition, the first data acquisition circuitry 11 acquires weather data (hereinafter, referred to as past second weather data) including radar rainfall amount values observed in the past (first time zone) in the second weather radar. It is noted that the second weather radar is configured to observe radar rainfall amount values at a plurality of points included in the observation range of the second weather radar. Hereinafter, a plurality of points (that is, point where second weather radar can observe radar rainfall amount value) included in the observation range of the second weather radar will be conveniently referred to as observation points of the second weather radar. It is noted that the past second weather data includes radar rainfall amount values observed at each of the plurality of observation points of the second weather radar.

Furthermore, the first data acquisition circuitry 11 acquires ground rainfall amount data (hereinafter, referred to as past ground rainfall amount data) including a ground rainfall amount value measured in the past (first time zone) by a ground rainfall meter. It is noted that the ground rainfall meter is a device that can be installed on the ground to measure a rainfall amount value at a point where the ground rainfall meter is installed. In the present embodiment, for example, a ground rainfall meter installed in a regional weather observation system (AMeDAS: Automated Meteorological Data Acquisition System) (ground rainfall amount value measured by the ground rainfall meter) is used. Hereinafter, the point where the ground rainfall meter is installed is referred to as a measurement point of the ground rainfall meter for convenience. It is noted that the ground rainfall amount data includes a ground rainfall amount value measured at each of the plurality of measurement points of the ground rainfall meter.

The past first and second weather data and the past ground rainfall amount data acquired by the first data acquisition circuitry 11 are stored in the first data storage 12.

The second data acquisition circuitry 13 acquires data for generating the above-described composite rainfall amount data. In this case, the second data acquisition circuitry 13 acquires weather data (hereinafter, referred to as current first weather data) including the current radar rainfall amount value observed by the first weather radar. It is noted that the current first weather data includes a radar rainfall amount value at each of the plurality of observation points of the first weather radar.

In this case, the second data acquisition circuitry 13 acquires weather data (hereinafter, referred to as current second weather data) including the current radar rainfall amount value observed by the second weather radar. It is noted that the current second weather data includes a radar rainfall amount value at each of the plurality of observation points of the second weather radar.

It is noted that "present" in the present embodiment intends "present" in a broad sense including a time zone (second time zone) later than the "past (first time zone)" described above, and is not intended to be limited to the current time or the like in the narrow sense.

As described above, in the present embodiment, the radar rainfall amount values (current radar rainfall amount values) observed by the first and second weather radars are configured to be composed, but at least some of the observation ranges (plurality of observation points) of the first and second weather radars overlap each other. In other words, in the present embodiment, it is assumed that the radar rainfall amount values are composed in overlapping observation ranges (observation points) of the first and second weather radars.

The current first and second weather data acquired by the second data acquisition circuitry 13 is stored in the second data storage 14.

The processing circuitry 15 includes a learning module 151 and a composition module 152. The learning module 151 is a functional module configured to execute processing of generating the above-described learned model, and includes a learning data generation module 151a and a learning processing module 151b.

The learning data generation module 151a acquires the past first and second weather data and the past ground rainfall amount data stored in the first data storage 12 from the first data storage 12. The learning data generation module 151a acquires a plurality of feature values related to accuracy of the radar rainfall amount values included in the acquired past first and second weather data. The learning data generation module 151a generates data (hereinafter, referred to as learning data) used for generation of the learned model based on the ground rainfall amount value included in the acquired past ground rainfall amount data and the plurality of acquired feature values.

Based on the learning data generated by the learning data generation module 151a, the learning processing module 151b generates a learned model learned so as to output (that is, to predict rainfall amount value from feature values) a parameter for estimating a rainfall amount value corresponding to a ground rainfall amount value included in the past ground rainfall amount data in a case where the plurality of feature values described above are input.

The learned model generated by the learning processing module 151b is stored in the model storage 16.

The composite module 152 is a functional module configured to execute processing of generating composite rainfall amount data (compose radar rainfall amount values), and includes a feature value acquisition module 152a and a composition processing module 152b.

The feature value acquisition module 152a acquires the current first and second weather data stored in the second data storage 14 from the second data storage 14. The feature value acquisition module 152a acquires a plurality of feature values related to accuracy of the radar rainfall amount values included in the acquired current first and second weather data. It is noted that the types of the plurality of feature values generated by the feature value acquisition module 152a correspond to the plurality of feature values acquired by the learning data generation module 151a to generate the learning data described above.

It is noted that the feature value in the present embodiment includes, for example, the feature value (hereinafter, referred to as feature value of first weather radar) related to the accuracy of the radar rainfall amount value observed by the first weather radar and the feature value (hereinafter, referred to as feature value of second weather radar) related to the accuracy of the radar rainfall amount value observed by the second weather radar. However, since the types of the first and second weather radars may be different in the present embodiment as described above, (type of) the feature value of the first weather radar and (type of) the feature value of the second weather radar do not need to match each other.

The composition processing module 152b acquires a learned model stored in the model storage 16, and acquires a parameter output from the learned model by inputting the plurality of feature values acquired by the feature value acquisition module 152a to the learned model. The composition processing module 152b composes the radar rainfall amount values included in each of the current first and second weather data acquired from the second data storage 14 described above based on the acquired parameter, thereby generating the composite rainfall amount data.

It is noted that, in FIG. 1, for the sake of convenience, it has been described that the first data acquisition circuitry 11 configured to acquire the past first and second weather data and the past ground rainfall amount data and the second data acquisition circuitry 13 configured to acquire the current first and second weather data are separately provided, but the first data acquisition circuitry 11 and the second data acquisition circuitry 13 may be implemented as one data acquisition circuitry.

In addition, in FIG. 1, for the sake of convenience, it has been described that the first data storage 12 configured to store the past first and second weather data and the past ground rainfall amount data and the second data storage 14 configured to store the current first and second weather data are separately provided, but the first data storage 12 and the second data storage 14 may be implemented as one data storage unit.

Furthermore, in the present embodiment, the information processing apparatus 10 will be described as including each of the components 11 to 16, but a part of the respective components 11 to 16 may be arranged outside the information processing apparatus 10.

FIG. 2 illustrates an example of a system configuration of the information processing apparatus 10 illustrated in FIG. 1. The information processing apparatus 10 includes a CPU 21, a nonvolatile memory 22, a RAM 23, a communication device 24, and the like.

The CPU 21 is a processor configured to control operations of various components in the information processing apparatus 10. The CPU 21 may be a single processor or may include a plurality of processors. The CPU 21 executes various programs loaded from the nonvolatile memory 22 to the RAM 23. These programs include various application programs including an operating system (OS) and a radar rainfall amount value composition program 23A.

The nonvolatile memory 22 is a storage medium used as an auxiliary storage apparatus. The RAM 23 is a storage medium used as a main storage apparatus. Although only the nonvolatile memory 22 and the RAM 23 are illustrated in FIG. 2, the information processing apparatus 10 may include other pieces of storage apparatus such as a hard disk drive (HDD) and a solid state drive (SSD).

The communication device 24 is a device configured to perform wired communication or wireless communication.

In the present embodiment, the first data acquisition circuitry 11 and the second data acquisition circuitry 13 illustrated in FIG. 1 are assumed to be implemented by, for example, the communication device 24 or the like for receiving various data, but may be implemented by another interface or the like for inputting the data.

In the present embodiment, the first data storage 12, the second data storage 14, and the model storage 16 illustrated in FIG. 1 are implemented by, for example, the nonvolatile memory 22 or another storage apparatus.

Furthermore, in the present embodiment, the processing circuitry 15 illustrated in FIG. 1 is implemented by at least one processor. The processor includes, for example, a control apparatus and an arithmetic apparatus, and is implemented by an analog or digital circuit or the like. The processor may be the CPU 21 described above, or may be a general-purpose processor, a microprocessor, a digital signal processor (DSP), an ASIC, an FPGA, or a combination thereof.

It is noted that a part or all of the processing circuitry 15 can be implemented by causing the CPU 21 (that is, computer of information processing apparatus 10) to execute the radar rainfall amount value composition program 23A, that is, by software. The radar rainfall amount value composition program 23A may be stored in a computer-readable storage medium and distributed, or may be downloaded to the information processing apparatus 10 through a network. It is noted that a part or all of the processing circuitry 15 may be implemented by dedicated hardware or the like.

It is noted that, in FIGS. 1 and 2 described above, the information processing apparatus 10 has been described as one apparatus, but the information processing apparatus 10 may include a plurality of apparatuses. Specifically, the information processing apparatus 10 may be configured as a system (radar rainfall amount value composition system) including, for example, a first apparatus (learning apparatus) including the first data acquisition circuitry 11, the first data storage 12, and the learning module 151, and a second apparatus (composition apparatus) including the second data acquisition circuitry 13, the second data storage 14, and the composition module 152. In this case, the model storage 16 may be included in the first apparatus or the second apparatus.

Hereinafter, the operation of the information processing apparatus 10 according to the present embodiment will be described. In the present embodiment, the information processing apparatus 10 mainly executes processing of generating a learned model (hereinafter, referred to as model generation processing) and processing of generating composite rainfall amount data (hereinafter, referred to as composite rainfall amount data generation processing).

First, an example of a processing procedure of the model generation processing will be described with reference to the flowchart of FIG. 3.

In the model generation processing, the first data acquisition circuitry 11 acquires past first weather data (past weather data of first weather radar) (step S1). The past first weather data acquired in step S1 includes past radar rainfall amount value observed in a predetermined period at each of the plurality of observation points of the first weather radar. The past first weather data may be acquired from, for example, the first weather radar, or may be acquired from an external apparatus (apparatus other than information processing apparatus 10 and the first weather radar) that manages the first weather data. Furthermore, the past first weather data may be stored (held) in advance inside the information processing apparatus 10.

Next, the first data acquisition circuitry 11 acquires past second weather data (past weather data of the second weather radar) (step S2). The past second weather data acquired in step S2 includes a past radar rainfall amount value observed in the same period as that of the first weather radar at each of the plurality of observation points of the second weather radar. The past second weather data may be acquired from, for example, the second weather radar, or may be acquired from an external apparatus (apparatus other than information processing apparatus 10 and second weather radar) that manages the second weather data. Furthermore, the past second weather data may be stored (held) in advance inside the information processing apparatus 10.

Here, the weather data (first and second weather data) in the present embodiment will be described. First, the weather radars (first and second weather radars) receive a reflected wave in which a radio wave transmitted from an antenna is reflected by raindrops, thereby acquiring observation data based on the reflected wave. In this case, the weather radar acquires observation data for each observation point (point included in observation range of weather radar) of the weather radar specified by each distance, each azimuth angle, and each elevation angle from the weather radar. It is noted that the weather radar performs observation at intervals of one minute (that is, observation data is acquired at intervals of one minute). It is noted that, in the present embodiment, a description will be given on the assumption that the weather radar performs observation at intervals of one minute, but the observation frequency of the weather radar is not limited to intervals of one minute, and may be, for example, intervals of thirty seconds or intervals of five minutes.

Here, when the weather radar is, for example, a single polarization radar configured to transmit a single radio wave (horizontal polarization) having a vibration component in a horizontal direction, the observation data acquired by the weather radar includes reception power, a reflectivity factor, a Doppler velocity, and a Doppler spectrum width (Doppler velocity variance). It is noted that the reception power and the reflectivity factor may be treated synonymously, but in the present embodiment, the reflectivity factor mainly represents intensity of the radio wave reflected from the raindrops and returned, and is calculated from the reception power.

In addition, when the weather radar is, for example, a multi-parameter radar configured to transmit two types of radio waves (polarized waves) having vibration components in the vertical direction and the horizontal direction, the observation data acquired by the weather radar includes a differential reflectivity (a difference of reflectivity factor between polarizations), a correlation coefficient between polarizations, and a differential phase (a phase difference between polarizations) based on transmission of the two types of radio waves, in addition to the reception power, the reflectivity factor, the Doppler velocity, and the Doppler spectrum width described above.

Here, the radar rainfall amount value R (mm/h) can be calculated from a reflectivity factor Z included in the observation data using the following formula (1) which is an empirical conversion formula. It is noted that B and β in formula (1) are empirically obtained constants.

$$Z = B \cdot R^{\beta} \qquad \text{Formula (1)}$$

Further, according to a differential phase included in the observation data described above, a specific differential phase (a distance change rate of differential phase) can be calculated, but the radar rainfall amount value R can also be calculated from a specific differential phase KDP using the following formula (2). It is noted that a and b in formula (2) are empirically obtained constants.

$$R(KDP) = a \cdot KDP^{b} \qquad \text{Formula (2)}$$

It is noted that the specific differential phase KDP is calculated using the following formula (3). That is, the specific differential phase KDP corresponds to a change rate of a differential phase $\varphi_{DP}$ with respect to a distance r.

$$KDP = \frac{\Phi_{DP}(r_2) - \Phi_{DP}(r_1)}{2(r_2 - r_1)} \qquad \text{Formula (3)}$$

As described above, in a case where the weather radar is a multi-parameter radar, the radar rainfall amount value is calculated using at least one of formulas (1) and (2), but in general, the radar rainfall amount value (that is, radar rainfall amount value calculated from a specific differential phase) calculated using formula (2) has higher accuracy than the radar rainfall amount value (that is, radar rainfall amount value calculated from reflectivity factor) calculated using formula (1). Therefore, for example, information such as a flag value (hereinafter, referred to as rainfall amount value calculation method flag) indicating that the radar rainfall amount value has been calculated using formula (1) or formula (2) (that is, method of calculating radar rainfall amount value) can be said to be a parameter useful for estimating the observation accuracy of the weather radar. It is noted that the rainfall amount value calculation method flag Q is represented as, for example, the following formula (4).

$$Q = \qquad \text{Formula (4)}$$
$$\begin{cases} 0 \text{ (if rainfall amount value } R \text{ is calculated using } Z) \\ 1 \text{ (if rainfall amount value } R \text{ is calculated using } KDP) \end{cases}$$

Furthermore, when there is a rain area between a position (radar site) where the weather radar is installed and an observation point of the weather radar, radio waves (transmission waves) transmitted from the weather radar and reflected waves (reception waves) from the observation point are attenuated by the rain area, and the observation accuracy of the weather radar deteriorates. Such an attenuation amount of radio waves is referred to as a rainfall attenuation amount.

Here, for example, a rainfall attenuation amount generated between a radar site and a predetermined observation point corresponds to an integrated value of the rainfall attenuation amount at each point between the radar site and the observation point. For example, according to "National Institute material No. 909 "examination material on technology for practical use of XRAIN rainfall amount observation" appendix B-13", the integrated value PIA (Path Integrated Attenuation) of the rainfall attenuation amount is calculated using the following formula (5).

$$PIA = \sum_{i=1}^{N} Ah(i) \times dr \; [\text{dB}] \qquad \text{Formula (5)}$$

It is noted that N in formula (5) is the number of observation data in the radial direction from the weather radar to the corresponding observation point, and dr is distance resolution (km) in the radial direction of the weather radar. In addition, Ah in formula (5) represents a rainfall attenuation amount at each point between the weather radar and the observation point. That is, formula (5) represents that the rainfall attenuation amount Ah is integrated in the distance direction. The rainfall attenuation amount Ah is calculated from the specific differential phase KDP and coefficients ah1 and ah2 using the following formula (6).

$$Ah=ah1 \times KDP^{ah2} \text{ [dB/km]} \qquad \text{Formula (6)}$$

Furthermore, the coefficient ah1 is calculated using the following formula (7), and the coefficient ah2 is calculated using the following formula (8). It is noted that EL in formulas (7) and (8) is an observation elevation angle (°).

$$ah1=0.2925+7 \times 10^{-4} \times EL+1 \times 10^{-5} \times EL^2+3 \times 10^{-6} \times EL^3 \qquad \text{Formula (7)}$$

$$ah2=1.1009-3 \times 10^{-5} \times EL-4 \times 10^{-6} \times EL^2 \qquad \text{Formula (8)}$$

The weather data (first and second weather data) in the present embodiment includes at least one of reception power, a reflectivity factor, a Doppler velocity, a Doppler spectrum width, a differential reflectivity, a correlation coefficient between polarizations, and a differential phase included in the observation data for each observation point of the weather radar described above, a specific differential phase calculated from the observation data, a rainfall amount value calculation method flag, and an integrated value of a rainfall attenuation amount, in addition to the radar rainfall amount value observed by the weather radar. In the following description, at least one of the reception power, the reflectivity factor, the Doppler velocity, the Doppler spectrum width, the differential reflectivity, the correlation coefficient between polarizations, the differential phase, the specific differential phase, the rainfall amount value calculation method flag, and the integrated value of the rainfall attenuation amount for each observation point included in the weather data is referred to as observation point data for convenience. In other words, in the present embodiment, the weather data includes a plurality of observation point data.

It is noted that the past first weather data is acquired in step S1 described above, and the past second weather data is acquired in step S2. However, since the types of the first and second weather radars may be different as described above, (each observation point data included in) the past first weather data and (each observation point data included in) the past second weather data may be different data. In other words, the data type, the quality, and the like of the past first and second weather data may be different. Specifically, when each observation point data included in the past first weather data is the reception power, the reflectivity factor, the Doppler velocity, the Doppler spectrum width, the differential reflectivity, the correlation coefficient between polarizations, the differential phase, the radar rainfall amount value, the specific differential phase, the rainfall amount value calculation method flag, and the integrated value of the rainfall attenuation amount, each observation point data included in the past second weather data may be only the radar rainfall amount value.

In addition, the first data acquisition circuitry 11 acquires past ground rainfall amount data (step S3). Here, the past ground rainfall amount data acquired in step S3 includes an hourly rainfall amount value (that is, ground rainfall amount value for each measurement point measured every hour) measured by the ground rainfall meter installed at each of the plurality of measurement points. In the present embodiment, a description will be given assuming that the ground rainfall amount value included in the past ground rainfall amount data is an hourly rainfall amount value, but the ground rainfall amount value may be a ten-minute rainfall amount value or the like. It is assumed that the past ground rainfall amount data can be acquired from, for example, a regional weather observation system including a ground rainfall meter or an external apparatus that manages ground rainfall amount data. Furthermore, the past ground rainfall amount data may be stored (held) in advance inside the information processing apparatus 10.

It is noted that, in the present embodiment, the observation point of the weather radar and the measurement point of the ground rainfall meter do not necessarily match each other, but it is assumed that the first and second weather data (observation periods of first and second weather radars) and the ground rainfall amount data (measurement period of ground rainfall meter) correspond to each other in terms of time.

Although FIG. 3 illustrates that the processing is executed in the order of steps S1 to S3, the order of the processing of steps S1 to S3 may be changed, or the processing of steps S1 to S3 may be executed in parallel.

It is noted that the past first weather data, the past second weather data, and the past ground rainfall amount data acquired in steps S1 to S3 are stored in the first data storage 12.

Here, in the present embodiment, the composite rainfall amount data generated by the information processing apparatus 10 is generated, for example, by assigning the radar rainfall amount value (that is, radar rainfall amount value observed by first or second weather radar) included in the first or second weather data to each coordinate point in a two-dimensional or three-dimensional coordinate system defined for the composite rainfall amount data. It is noted that the coordinate point to which the radar rainfall amount value is assigned corresponds to a grid point when the range in which the composite rainfall amount data is generated is divided into grids.

Therefore, the learning data generation module 151a converts the past first and second weather data acquired in steps S1 and S2 (past first and second weather data stored in first data storage 12) into data corresponding to the coordinate system defined for the composite rainfall amount data (step S4).

It is noted that, in the present embodiment, a description will be given on the assumption that the coordinate system defined for the composite rainfall amount data is a coordinate plane defined by, for example, latitude and longitude.

Here, as described above, the past first and second weather data include observation point data corresponding to a plurality of observation points of the first and second weather radars. In this case, the learning data generation module 151a converts the plurality of observation point data included in the first and second weather data into a plurality of coordinate point data corresponding to a plurality of coordinate points in a coordinate plane (two-dimensional coordinate system) defined for the composite rainfall amount data.

According to the above description, for example, the reception power, the reflectivity factor, the Doppler velocity, the Doppler spectrum width, the differential reflectivity, the correlation coefficient between polarizations, the differential phase, the radar rainfall amount value, the specific differential phase, the rainfall amount value calculation method flag, and the integrated value of the rainfall attenuation amount for each observation point included in the past first weather data are converted into the reception power, the reflectivity factor, the Doppler velocity, the Doppler spectrum width, the differential reflectivity, the correlation coefficient between polarizations, the differential phase, the radar rainfall amount value, the specific differential phase, the rainfall amount value calculation method flag, and the integrated value of the rainfall attenuation amount for each coordinate point in the coordinate plane defined for the composite rainfall amount data. In addition, for example, the radar rainfall amount value for each observation point included in the past second weather data is converted into the radar rainfall amount value for each coordinate point on the coordinate plane defined for the composite rainfall amount data.

A correspondence relationship (positional relationship) between the plurality of observation points of the first and second weather radars and the plurality of coordinate points on the coordinate plane defined for the composite rainfall amount data is set (recognized) in advance, and the processing of step S4 may be executed based on the correspondence relationship.

When the processing of step S4 is executed, the learning data generation module 151a acquires a plurality of feature values related to accuracy of radar rainfall amount values included in the past first and second weather data based on the past first and second weather data converted in step S4 (step S5). It is noted that since the processing in step S5 is executed based on the first and second weather data subjected to the processing in step S4, in step S5, a plurality of feature values are acquired for each coordinate point on the coordinate plane defined in the composite rainfall amount data.

Hereinafter, the processing of step S5 will be described. First, the learning data generation module 151a acquires (extracts), for example, coordinate point data included in the first and second weather data as feature values. As described above, in a case where the coordinate point data included in the past first weather data is the reception power, the reflectivity factor, the Doppler velocity, the Doppler spectrum width, the differential reflectivity, the correlation coefficient between polarizations, the differential phase, the radar rainfall amount value, the specific differential phase, the rainfall amount value calculation method flag, and the integrated value of the rainfall attenuation amount, the learning data generation module 151a acquires each of the reception power, the reflectivity factor, the Doppler velocity, the Doppler spectrum width, the differential reflectivity, the correlation coefficient between polarizations, the differential phase, the radar rainfall amount value, the specific differential phase, the rainfall amount value calculation method flag, and the integrated value of the rainfall attenuation amount for each coordinate point as the feature value. Furthermore, as described above, when the coordinate point data included in the past second weather data is the radar rainfall amount value, the learning data generation module 151a acquires the radar rainfall amount value for each coordinate point as the feature value.

In addition, in the present embodiment, in addition to the above-described feature values, a new feature value regarding the accuracy of the radar rainfall amount value obtained by composing the past first and second weather data may be acquired (generated).

Specifically, the learning data generation module 151a generates, for example, a difference between a radar rainfall amount value (that is, radar rainfall amount value observed by first weather radar) included in the past first weather data and a radar rainfall amount value (that is, radar rainfall amount value observed by second weather radar) included in the past second weather data as a new feature value. In this case, the learning data generation module 151a calculates a difference between radar rainfall amount values corresponding to the same coordinate point.

It is noted that, in the present embodiment, it is mainly assumed that radar rainfall amount values observed by two weather radars (first and second weather radars) are composed, but the present embodiment may be applied to, for example, a case of composing radar rainfall amount values observed by three or more weather radars. In this case, a difference in radar rainfall amount value for each combination of two weather radars can be acquired as a new feature value.

In addition, as described above, when the radar rainfall amount values observed by three or more weather radars are composed, a difference between a reference value and a radar rainfall amount value observed by each of the three or more weather radars may be acquired as a new feature value. It is noted that the reference value may be a radar rainfall amount value observed by one of the three or more weather radars, or may be a composite rainfall amount value obtained by composing radar rainfall amount values observed by two or more of the three or more weather radars. It is noted that the composite rainfall amount value (that is, composite rainfall amount value used as reference value for acquiring feature value) described here may be an average value of radar rainfall amount values observed by each of two or more weather radars, or may be a radar rainfall amount value observed by one weather radar selected based on the observation accuracy of the two or more weather radars.

Here, it has been described that a difference between the radar rainfall amount values is acquired as a new feature value, but a difference between other feature values other than the radar rainfall amount value may be acquired as a new feature value.

Furthermore, the learning data generation module 151a may acquire (generate) a feature value representing a rainfall distribution as a new feature value. The feature value representing the rainfall distribution includes a spatial average value, a standard deviation (variance value), a maximum value, a ratio of coordinate points (grid points) at which rainfall is observed, and the like of radar rainfall amount values observed by each of the first and second weather radars.

Meanwhile, as described above, while the ground rainfall amount value is an hourly rainfall amount, observation data is acquired at intervals of one minute, for example, in the first and second weather radars (that is, feature values at intervals of one minute are acquired). Therefore, the learning data generation module 151a acquires (generates) a feature value corresponding to the ground rainfall amount value (AMeDAS hourly rainfall amount value) included in the past ground rainfall amount data from each of the plurality of feature values acquired as described above. The feature value corresponding to the ground rainfall amount value is, for example, an average value of feature values corresponding to one hour (hereinafter, referred to as measurement period of ground rainfall amount value) during which the ground rainfall amount value is measured among feature values acquired for a coordinate point (hereinafter, referred to as target coordinate point) closest to a measurement point (that is, point where ground rainfall meter is installed) of the ground rainfall meter. In other words, the feature value corresponding to the ground rainfall amount value is acquired by taking an average of time samples in the same period as the measurement period of the ground rainfall amount value.

Specifically, for example, when the radar rainfall amount value observed by the first weather radar is described as an example, the radar rainfall amount value (feature value)

corresponding to the ground rainfall amount value is an average value of the radar rainfall amount values observed by the first weather radar for one hour when the ground rainfall amount value is measured. Here, the radar rainfall amount value observed by the first weather radar has been described, but the same applies to other feature values. That is, in step S5, a plurality of feature values corresponding to the ground rainfall amount value are acquired.

It is noted that the feature value corresponding to the ground rainfall amount value may be acquired (generated) by another method.

Specifically, the feature value corresponding to the ground rainfall amount value may be acquired in consideration of, for example, a radar rainfall amount value. For example, on the assumption that the feature value is the rainfall amount value calculation method flag, the ratio of the radar rainfall amount value in which the value of the rainfall amount value calculation method flag is 1 to the integrated value of the radar rainfall amount value corresponding to the measurement period of the ground rainfall amount value among the radar rainfall amount values acquired for the target coordinate point may be acquired as the rainfall amount value calculation method flag (feature value) corresponding to the ground rainfall amount value.

A feature value $Q_{hour}$ corresponding to the ground rainfall amount value in this case is calculated using the following formula (9).

$$Q_{hour} = \frac{\sum_{k=0}^{N} R(k) * Q(k)}{\sum_{k=0}^{N} R(k)} \qquad \text{Formula (9)}$$

It is noted that the rainfall amount value calculation method flag Q in formula (9) is 0 in the case of the radar rainfall amount value R calculated from the reflectivity factor Z and 1 in the case of the radar rainfall amount value R calculated from the specific differential phase KDP as represented in formula (4). In addition, N in formula (9) is the number of radar rainfall amount values (samples) during the above-described measurement period of the ground rainfall amount value.

The feature value $Q_{hour}$ corresponding to the ground rainfall amount value calculated using formula (9) has a smaller change in the characteristic of the feature value than a case where the average value of the samples during the measurement period of the ground rainfall amount value is the feature value corresponding to the ground rainfall amount value. In general, in a case where a machine learning algorithm is applied, since it is more preferable as the characteristic of the feature value used when the learned model is generated (In the present embodiment, the same corresponds to step S7 illustrated in FIG. 3 to be described later) and the characteristic of the feature value used when a prediction result is output using the learned model (In the present embodiment, the same corresponds to step S16 illustrated in FIG. 4 to be described later) are closer to each other, it is considered that it is useful to acquire the feature value corresponding to the ground rainfall amount value using formula (9) in the rainfall amount value calculation method flag Q.

Similarly, as compared with the case where the average value of the samples within the measurement period of the ground rainfall amount value is the feature value corresponding to the ground rainfall amount value, in the feature value in which the change in the characteristic is considered to be smaller when the feature value corresponding to the ground rainfall amount value is calculated by formula equivalent to formula (9), it is preferable to calculate the feature value corresponding to the ground rainfall amount value by formula equivalent to formula (9).

Next, the feature value $Q_{hour}$ corresponding to the ground rainfall amount value calculated using formula (9) indicates that the change in the characteristic with respect to the feature value for each sample is small as compared with the case where the average value of the samples during the measurement period of the ground rainfall amount value is the feature value corresponding to the ground rainfall amount value. First, the rainfall amount value calculation method flag Q is a flag indicating from which of the specific differential phase and the reflectivity factor the radar rainfall amount value of the sample is calculated as described above. In other words, the rainfall amount value calculation method flag Q is a feature value indicating which of the specific differential phase and the reflectivity factor contributes to the calculation of the radar rainfall amount value of the sample. In a case where the feature value corresponding to the average value of the samples during the measurement period of the ground rainfall amount value or the ground rainfall amount value is generated by formula (9) from the rainfall amount value calculation method flag Q of each sample, the feature value corresponding to the ground rainfall amount value is a value between 0 and 1. The feature value corresponding to the ground rainfall amount value is considered to be a feature value indicating that the closer to 1, the larger the contribution of the specific differential phase, and the closer to 0, the larger the contribution of the reflectivity factor.

Based on the above description, as an example, a case will be described in which the radar rainfall amount value of half samples during the measurement period of the ground rainfall amount value is 30 mm/h and the rainfall amount value calculation method flag Q is 1 (sample in which radar rainfall amount value is calculated from a specific differential phase), and the radar rainfall amount value of remaining half samples is 2 mm/h and the rainfall amount value calculation method flag Q is 0 (sample in which radar rainfall amount value is calculated from reflectivity factor). In this case, the radar rainfall amount value corresponding to the ground rainfall amount value is 16 mm/h (average value of samples during measurement period of ground rainfall amount value). Here, 15 mm/h among the radar rainfall amount value of 16 mm/h corresponding to the ground rainfall amount value is due to the contribution of the sample having the radar rainfall amount value with the rainfall amount value calculation method flag Q of 1. In addition, the average value of samples of the rainfall amount value calculation method flag during the measurement period of the ground rainfall amount value is 0.50, and $Q_{hour}$ calculated using formula (9) is 0.94. The average value 0.50 of the samples of the rainfall amount value calculation method flag during the measurement period of the ground rainfall amount value means that the magnitudes of contribution of the specific differential phase and the reflectivity factor to the radar rainfall amount value of 16 mm/h corresponding to the ground rainfall amount value are equivalent, and it is not reflected that the contribution of the specific differential phase is larger than the contribution of the reflectivity factor. Meanwhile, in the case of using $Q_{hour}=0.94$ ($=^{15}/_{16}$) calculated using formula (9), it can be reflected that the contribution of the specific differential phase is larger than the contribution of the reflectivity factor with respect to the radar rainfall amount value of 16 mm/h corresponding to the ground rainfall amount value. As described above, in the rainfall amount value calculation method flag Q, the characteristic change with respect to the feature value for each sample is smaller when the feature value corresponding to the ground rainfall amount value is acquired in consideration of the radar rainfall amount value (that is, by using formula (9)) than when the average value of the samples during the measurement period of the ground rainfall amount value is the feature value corresponding to the ground rainfall amount value.

It is noted that the feature value described here is an example, and in step S5, a plurality of feature values regarding the accuracy of the radar rainfall amount value may be acquired based on the past first and second weather data. That is, the plurality of feature values acquired in step S5 may be obtained by omitting some of the plurality of feature values described here, or may include feature values other than the feature values described here.

When the processing in step S5 is executed, the learning data generation module 151a generates learning data based on the past ground rainfall amount data acquired in step S3 (past ground rainfall amount data stored in the first data storage 12) and a plurality of feature values acquired in step S5 (a plurality of feature values corresponding to ground rainfall amount values) (step S6).

In this case, the learning data generation module 151a generates learning data in which a ground rainfall amount value (hourly rainfall amount value) included in past ground rainfall amount data is teacher data (true value). Specifically, for example, the learning data generation module 151a generates, as learning data, a data set including identification information (teacher data) for identifying the first or second weather radar that has observed the radar rainfall amount value closest to the ground rainfall amount value included in the past ground rainfall amount data (radar rainfall amount value corresponding to ground rainfall amount value) and a plurality of feature values corresponding to the ground rainfall amount value, for each target coordinate point (coordinate point closest to measurement point of ground rainfall meter) described above.

It is noted that, here, the description has been given on the assumption that the identification information for identifying the first or second weather radar that has observed the radar rainfall amount value closest to the ground rainfall amount value is used as the teacher data. However, the identification information is not limited to one weather radar that has observed the closest radar rainfall amount value, and the identification information for identifying one or more weather radars having a small difference from the ground rainfall amount value may be used as the teacher data.

As the identification information for identifying the first or second weather radar, for example, a number (hereinafter, referred to as radar number) assigned to the first or second weather radar can be used.

In addition, although detailed description is omitted, in a case where a plurality of ground rainfall amount values having different times are included in the past ground rainfall amount data acquired in step S3, the processing in steps S5 and S6 described above is executed for each time (ground rainfall amount value).

Next, the learning processing module 151b executes learning processing using the learning data generated in step S6 (step S7).

In step S7, supervised learning is performed with each of the plurality of feature values corresponding to the ground rainfall amount value as an explanatory variable and teacher data (radar number) as an objective variable. It is noted that the supervised learning is performed based on a known machine learning algorithm such as a random forest, a support vector machine, a gradient boosting decision tree, or a neural network. In addition, preprocessing such as standardization for converting the distribution of the values of the respective feature values into data of an average of 0 and a variance of 1 may be executed in step S7 in accordance with a method (machine learning algorithm) of performing supervised learning.

In a case where the processing of step S7 described above is executed, in a case where a plurality of feature values are input, a learned model learned (constructed) so as to output a radar number assigned to a weather radar estimated (predicted) to observe a radar rainfall amount value (radar rainfall amount value with high accuracy) corresponding to a ground rainfall amount value is generated. It is noted that the learned model in the present embodiment performs learning so as to output a radar number for each coordinate point on a coordinate plane defined in the above-described composite rainfall amount data according to a plurality of feature values. In the present embodiment, such a radar number is used when the composite rainfall amount data is generated as a parameter for estimating a rainfall amount value corresponding to a ground rainfall amount value.

The learned model generated by executing the processing in step S7 is stored in the model storage 16.

Figure 4:
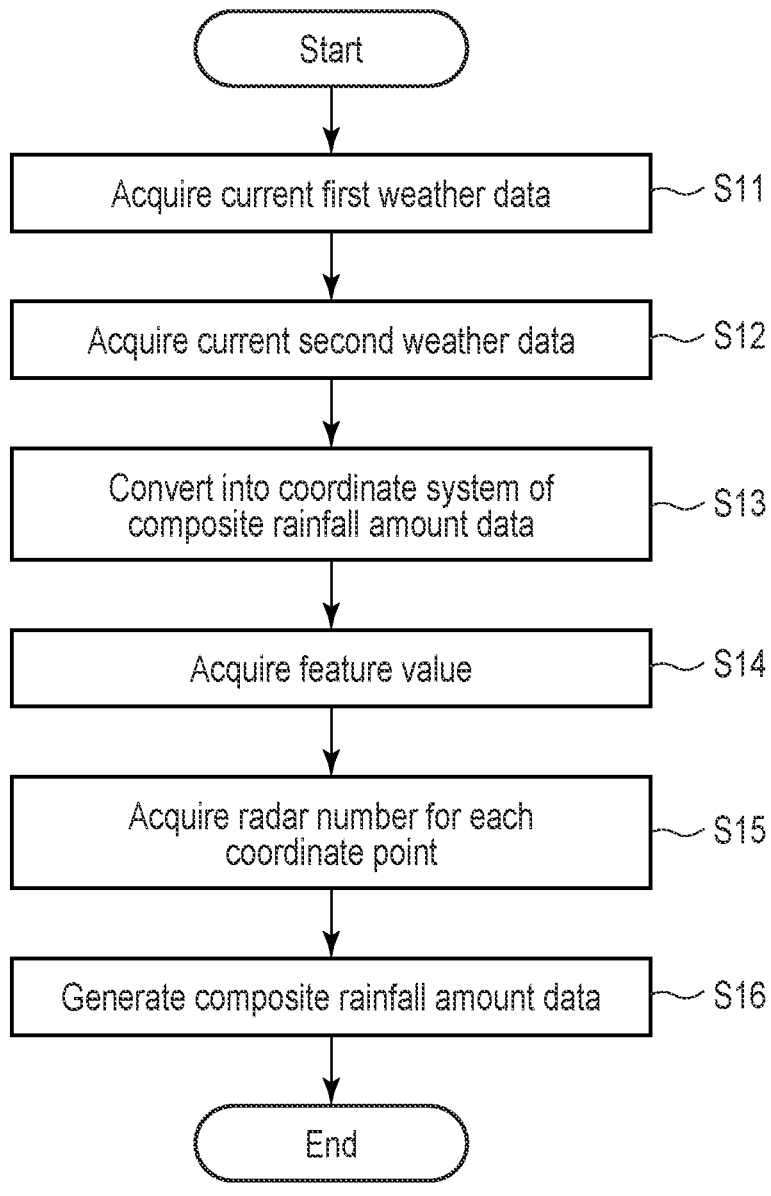
FIG. 4 is a flowchart illustrating an example of a processing procedure of composite rainfall amount data generation processing.

It is noted that the learned model generated by the model generation processing illustrated in FIG. 3 can be repeatedly used in the subsequent composite rainfall amount data generation processing (processing illustrated in FIG. 4). Therefore, the model generation processing illustrated in FIG. 3 does not need to be executed every time the composite rainfall amount data generation processing is executed. In addition, the learning module 151 that executes the model generation processing illustrated in FIG. 3 and the composition module 152 that executes the composite rainfall amount data generation processing illustrated in FIG. 4 may be separate apparatuses.

Next, an example of a processing procedure of the composite rainfall amount data generation processing will be described with reference to a flowchart of FIG. 4.

In the composite rainfall amount data generation processing, the second data acquisition circuitry 13 acquires current first weather data (current weather data of first weather radar) (step S11). The current first weather data acquired in step S11 includes the current radar rainfall amount value observed at each of the plurality of observation points of the first weather radar. This current first weather data may be acquired from, for example, the first weather radar, or may be acquired from an external apparatus (apparatuses other than information processing apparatus 10 and first weather radar) that manages the first weather data.

Next, the second data acquisition circuitry 13 acquires current second weather data (current weather data of second weather radar) (step S12). The current second weather data acquired in step S12 includes the current radar rainfall amount value observed at each of the plurality of observation points of the second weather radar. This current second weather data may be acquired from, for example, the second weather radar, or may be acquired from an external apparatus (apparatuses other than information processing apparatus 10 and second weather radar) that manages the second weather data.

Here, the above-described past first and second weather data have been described as including a plurality of observation point data, but the current first and second weather data also include observation point data (current observation point data) having the same data type and quality as the plurality of observation point data included in the past first and second weather data. That is, for example, when each observation point data (each past observation point data) included in the past first weather data is the reception power, the reflectivity factor, the Doppler velocity, the Doppler spectrum width, the differential reflectivity, the correlation coefficient between polarizations, the differential phase, the radar rainfall amount value, the specific differential phase, the rainfall amount value calculation method flag, and the integrated value of rainfall attenuation amount, each observation point data included in the current first weather data is similarly the reception power, the reflectivity factor, the Doppler velocity, the Doppler spectrum width, the differential reflectivity, the correlation coefficient between polarizations, the differential phase, the radar rainfall amount value, the specific differential phase, the rainfall amount value calculation method flag, and the integrated value of rainfall attenuation amount. In addition, for example, when each observation point data included in the past second weather data is only the radar rainfall amount value, each observation point data included in the current second weather data is similarly only the radar rainfall amount value.

Although FIG. 4 illustrates that the processing is executed in the order of steps S11 and S12, the order of the processing of steps S11 and S12 may be switched, or the processing of steps S11 and S12 may be executed in parallel.

It is noted that the current first and second weather data acquired in steps S11 and S12 are stored in the second data storage 14.

Next, the feature value acquisition module 152a converts the current first and second weather data (current first and second weather data stored in second data storage 14) acquired in steps S11 and S12 into data corresponding to a coordinate system defined for the composite rainfall amount data (step S13). It is noted that the processing in step S13 is similar to the processing in step S4 illustrated in FIG. 3 described above except that the past first and second weather data are set as the current first and second weather data, and thus a detailed description thereof will be omitted here.

When the processing of step S13 is executed, the feature value acquisition module 152a acquires a plurality of feature values related to accuracy of radar rainfall amount values included in the current first and second weather data based on the current first and second weather data converted in step S13 (step S14). It is noted that the processing in step S14 is similar to the processing in step S5 illustrated in FIG. 3 described above except that the past first and second weather data are set as the current first and second weather data, and thus a detailed description thereof will be omitted here. That is, in step S14, a feature value having the same type as the feature value acquired in step S5 illustrated in FIG. 3 is acquired.

Note that, in step S5 illustrated in FIG. 3, it has been described that the plurality of feature values corresponding to the ground rainfall amount value (one hour for which the rainfall amount value is measured) are acquired, but since the current first and second weather data are acquired in the composite rainfall amount data generation processing, a plurality of feature values corresponding to the current (current time) are obtained in step S14.

Next, the composition processing module 152b executes processing of composing radar rainfall amount values (that is, current radar rainfall amount values observed by first and second weather radars) included in the current first and second weather data using the learned model generated in the model generation processing described above.

In this case, the composition processing module 152b inputs the plurality of feature values-acquired in step S14 described above to the learned model stored in the model storage 16 to acquire the radar number (number assigned to first or second weather radar) output for each coordinate point from the learned model (step S15). It is noted that the radar number for each coordinate point acquired in step S15 corresponds to a radar number assigned to a weather radar (first or second weather radar) estimated to observe a radar rainfall amount value close to a ground rainfall amount value at the coordinate point.

Next, the composition processing module 152b generates composite rainfall amount data based on the radar number acquired for each coordinate point in step S15 (step S16).

Here, the composite rainfall amount data is generated by assigning a composite rainfall amount value to each coordinate point on the coordinate plane defined in the composite rainfall amount data as described above. In this case, the composition processing module 152b executes, for all the coordinate points, the processing of assigning the radar rainfall amount value (current radar rainfall amount value corresponding to coordinate point) observed by the weather radar (first or second weather radar) to which the radar number acquired for the specific coordinate point in step S15 is assigned as the composite rainfall amount value to the coordinate point.

Specifically, for example, when a radar number assigned to the first weather radar is acquired (estimated) for a first coordinate point on a coordinate plane defined in the composite rainfall amount data, a current radar rainfall amount value (that is, radar rainfall amount value included in current first weather data) observed by the first weather radar is assigned to the first coordinate point. In addition, for example, when a radar number assigned to the second weather radar is acquired (estimated) for a second coordinate point on a coordinate plane defined in the composite rainfall amount data, a current radar rainfall amount value (that is, radar rainfall amount value included in current second weather data) observed by the second weather radar is assigned to the second coordinate point.

Figures 5, 6, 7:
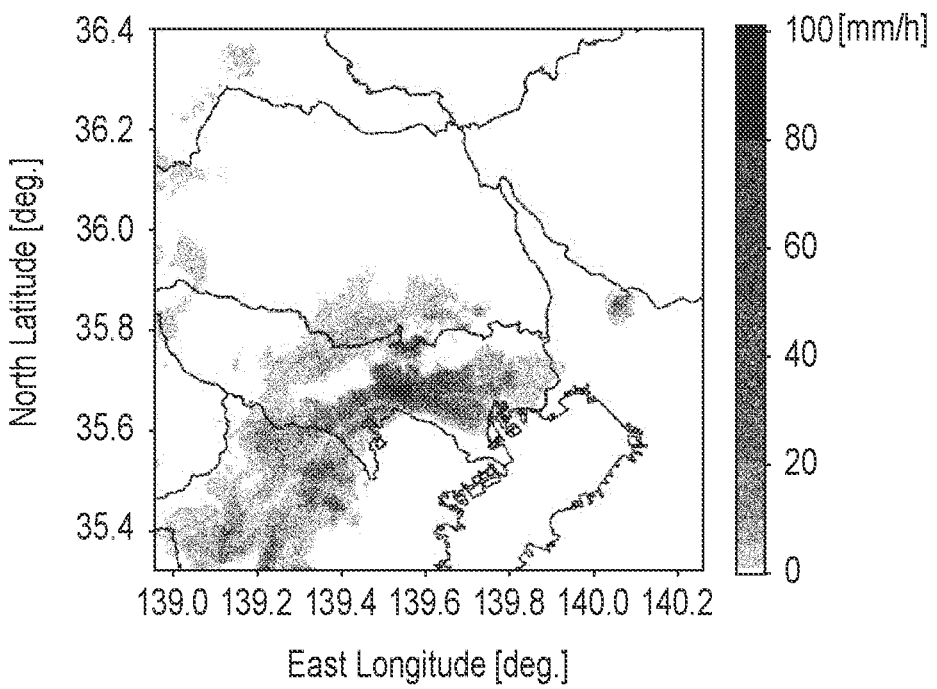
FIG. 5 is a diagram illustrating an example of a display mode of composite rainfall amount data.
FIG. 6 is a diagram illustrating accuracy of the composite rainfall amount data generated in the present embodiment.
FIG. 7 is a diagram illustrating accuracy of composite rainfall amount data generated in a modification of the present embodiment.

The composite rainfall amount data generated by executing the above composite rainfall amount data generation processing is displayed on, for example, a terminal apparatus (for example, smartphone, tablet computer, or the like) used by a user. In this case, the composite rainfall amount data can be displayed in a mode of being superimposed on a map, for example, as illustrated in FIG. 5. According to this, a color corresponding to the composite rainfall amount value assigned to each coordinate point can be displayed on the map.

As described above, in the model learning processing in the present embodiment, a plurality of feature values (first feature values) related to accuracy of radar rainfall amount values (first and second radar rainfall amount values observed in first time zone) included in the first and second weather data in the past (first time zone) are acquired, learning data is generated based on the ground rainfall amount values included in the past ground rainfall amount data and the plurality of feature values, and a learned model learned so as to output a parameter for estimating a rainfall amount value corresponding to a ground rainfall amount value included in the past ground rainfall amount data in a case where the plurality of feature values are input is generated based on the learning data.

In addition, in the composite rainfall amount data generation processing in the present embodiment, a plurality of feature values (second feature values) related to the accuracy of the radar rainfall amount values (first and second radar rainfall amount values observed in second time zone) included in the first and second weather data at the present time (second time zone after first time zone) are acquired, a parameter output from the learned model is acquired by inputting the plurality of feature values to the learned model, and the composite rainfall amount data is generated by composing the radar rainfall amount values included in the current first and second weather data based on the parameter. In the present embodiment, even when there are a large number of feature values that directly or indirectly affect the observation accuracy of the weather radar (accuracy of radar rainfall amount value), it is possible to sufficiently utilize the large number of feature values by applying the machine learning algorithm, and thus, it is possible to generate highly accurate composite rainfall amount data.

Here, the accuracy of the composite rainfall amount data generated in the present embodiment will be briefly described. For example, it is considered that a ground rainfall amount value (hourly rainfall amount value) $y_i$ at a measurement point i (AMeDAS point) where a ground rainfall meter for measuring a ground rainfall amount value of 0.5 mm/h or more is installed is set as a true value, and an hourly average value $R_i$ of a composite rainfall amount value assigned to a coordinate point (grid point) closest to the measurement point is evaluated by a root mean squared error (RMSE) indicated in the following formula (10).

$$RMSE = \sqrt{\frac{1}{N}\sum_{i=1}^{N}(R_i - y_i)^2} \qquad \text{Formula (10)}$$

It is noted that N in formula (10) is the number of times (that is, total number of AMeDAS data) that the ground rainfall amount value of 0.5 mm/h or more was measured during the period to be evaluated.

FIG. 6 illustrates a comparison result of the RMSE between the composite rainfall amount data generated in the comparative example of the present embodiment described above and the composite rainfall amount data generated in the present embodiment. The RMSE is an accuracy evaluation index indicating that the accuracy is higher as the value is smaller. However, as illustrated in FIG. 6, the RMSE of the composite rainfall amount data generated in the present embodiment is smaller than the RMSE of the composite rainfall amount data generated in the comparative example of the present embodiment. That is, according to FIG. 6, it can be said that the present embodiment can realize the generation of the composite rainfall amount data with high accuracy as compared with the comparative example of the present embodiment.

Furthermore, the present embodiment can be applied even in a case where the type of the weather radar that composes the radar rainfall amount value and the organization that operates the weather radar are different (that is, data types and qualities of first and second weather data are different), and thus can be easily introduced into various weather radar systems.

Meanwhile, in the present embodiment, although it has been mainly described that the learning data includes a plurality of feature values acquired based on the past first and second weather data and identification information (radar number assigned to first or second weather radar) for identifying the first or second weather radar that has observed a radar rainfall amount value close to a ground rainfall amount value indicated by the past ground rainfall amount data, the learned model learns so as to output the radar number when the plurality of feature values are input, and the composite rainfall amount data including the current radar rainfall amount value observed by the first or second weather radar to which the radar number output from the learned model is assigned when the plurality of feature values acquired based on the current first and second weather data are input is generated as the composite rainfall amount value, the present embodiment may have a configuration in which the composite rainfall amount data is generated using the learned model learned so as to output the parameter for estimating the rainfall amount value corresponding to the ground rainfall amount value as described above.

Specifically, the learned model may learn so as to output, for each of the first and second weather radars, a probability of observing a radar rainfall amount value close to a ground rainfall amount value as a parameter in a case where a plurality of feature values acquired based on the past first and second weather data are input. It is noted that this learned model outputs a probability for each coordinate point, similarly to the radar number described above. In this case, the composite rainfall amount data is generated by composing current radar rainfall amount values observed by the first and second weather radars with probabilities output for each of the first and second weather radars as parameters from the learned model as weights when a plurality of feature values acquired based on the current first and second weather data are input. Specifically, for example, on the assumption that the probability of the first weather radar output from the learned model for a specific coordinate point is 80% and the probability of the second weather radar is 20%, it is possible to generate composite rainfall amount data including a result (that is, weighted average value of radar rainfall amount values observed by the first and second weather radars) obtained by adding the radar rainfall amount value observed by the first weather radar×80% and the radar rainfall amount value observed by the second weather radar×20% as a composite rainfall amount value corresponding to the coordinate point.

Furthermore, in the present embodiment, it has been described that the learning data includes a plurality of feature values and radar numbers. However, for example, in order to generate a learned model capable of directly estimating a ground rainfall amount value instead of a radar number, the learning data may include a plurality of feature values acquired based on the past first and second weather data and a ground rainfall amount value (teacher data) included in the past ground rainfall amount data. According to such learning data, it is possible to cause the learned model to learn so as to output the estimated rainfall amount value corresponding to the ground rainfall amount value as a parameter in a case where a plurality of feature values are input, and it is possible to generate the composite rainfall amount data including the estimated rainfall amount value output as a parameter from the learned model for each coordinate point in a case where a plurality of feature values acquired based on the current first and second weather radars are input.

It is noted that, on the assumption that the configuration for generating the composite rainfall amount data using the learned model capable of directly estimating the ground rainfall amount value as described above is a modification of the present embodiment, FIG. 7 illustrates a comparison result of the RMSE between the composite rainfall amount data generated in the comparative example of the present embodiment and the composite rainfall amount data generated in the modification of the present embodiment. As illustrated in FIG. 7, the RMSE of the composite rainfall amount data generated in the present embodiment has a smaller value than the RMSE of the composite rainfall amount data generated in the comparative example of the present embodiment. That is, according to FIG. 7, compared with the comparative example of the present embodiment, it can be said that the modification of the present embodiment can realize generation of highly accurate composite rainfall amount data.

In addition, in the present embodiment described above, the composite rainfall amount data including the radar rainfall amount value (that is, radar rainfall amount value observed by first or second weather radar) selected based on the radar number output from the learned model as the composite rainfall amount value is generated, but the modification of the present embodiment corresponds to a configuration in which the composite rainfall amount data including a new composite rainfall amount value different from the radar rainfall amount values observed by the plurality of weather radars (first and second weather radars) is generated. Therefore, in the modification of the present embodiment, the degree of freedom of the composite rainfall amount value included in the composite rainfall amount data is high, and there is a high possibility that the composite rainfall amount value (estimated rainfall amount value) closer to the ground rainfall amount value can be obtained as compared with the present embodiment.

On the other hand, in the modification of the present embodiment, in a case where weather data (that is, weather data of rare rainfall case) having rainfall cases (local heavy rain, typhoon, weather front, and the like) that are not similar to the past weather data (that is, learning data) is acquired as the current weather data, there is a possibility that the accuracy of the estimated rainfall amount value output from the learned model becomes unstable. Therefore, in a case where the stability of the composite rainfall amount data is emphasized, the learned model described in the present embodiment may be used.

It is noted that, in the present embodiment, for example, it has been described that the first weather data includes, in addition to the radar rainfall amount value (first radar rainfall amount value) at each observation point of the first weather radar calculated based on the reflected wave (first reflected wave) of the radio wave transmitted from the first weather radar, at least one of the reception power, the reflectivity factor, the Doppler velocity, the Doppler spectrum width, the differential reflectivity, the correlation coefficient between polarizations, the differential phase, the specific differential phase, the flag value (rainfall amount value calculation method flag) indicating the method of calculating the radar rainfall amount value, and the integrated value of the rainfall attenuation amount. However, the first weather data may be data including other data. Although the first weather data has been described here, the same applies to the second weather data.

Further, in the present embodiment, it has been mainly described that the two-dimensional coordinate system (coordinate plane) is defined for the composite rainfall amount data, but the coordinate system may be a three-dimensional coordinate system (three-dimensional coordinate space) defined by latitude, longitude, and altitude. That is, the composite rainfall amount data generated in the present embodiment may be data in which a composite rainfall amount value is assigned to each coordinate point in the three-dimensional coordinate space.

In this case, it is possible to generate three-dimensional composite rainfall amount data by generating learning data for a plurality of feature values acquired based on the first and second weather data including observation point data for each observation point near the ground (low elevation angle) and performing estimation by a learned model for each coordinate point in a coordinate space defined for the composite rainfall amount data (that is, outputting parameter for estimating rainfall amount value corresponding to ground rainfall amount value). It is noted that the feature value for each coordinate point in the coordinate space defined in the composite rainfall amount data may be acquired based on the first and second weather data including observation point data for each observation point from near the ground (low elevation angle) to the sky (high elevation angle).

Second Embodiment

Next, a second embodiment will be described. In the present embodiment, detailed description of parts similar to those of the first embodiment described above will be omitted, and parts different from those of the first embodiment will be mainly described. It is noted that a configuration of an information processing apparatus according to the present embodiment is similar to that of the first embodiment described above, and thus the same will be appropriately described with reference to FIG. 1 and the like.

In the first embodiment described above, the configuration has been described in which the first and second weather data are used for generation of the learned model and generation of composite rainfall amount data. However, the present embodiment is different from the first embodiment in that, for example, forecast data including forecast values regarding a plurality of meteorological elements provided by an external apparatus is further used. Specifically, in the present embodiment, for example, numerical forecast data (GPV) obtained using a meso numerical forecast model introduced to the Meteorological Agency is used.

Hereinafter, the operation of the information processing apparatus 10 according to the present embodiment will be described. Here, similarly to the first embodiment described above, model generation processing and composite rainfall amount data generation processing will be described.

First, an example of a processing procedure of the model generation processing will be described with reference to a flowchart of FIG. 8.

In the model generation processing in the present embodiment, the processing of steps S21 and S22 corresponding to the processing of steps S1 and S2 illustrated in FIG. 3 described above is executed.

Next, the first data acquisition circuitry 11 acquires past forecast data (forecast data including past forecast values) (step S23). The past forecast data is, for example, past numerical forecast data obtained using the meso numerical forecast model GPV described above, and is acquired from an external apparatus or the like that operates the meso numerical forecast model GPV. Furthermore, the past forecast data may be stored (held) in advance inside the information processing apparatus 10.

Here, the forecast data (numerical forecast data) in the present embodiment will be described. For example, the forecast data is data including numerical values (forecast values) forecast at points disposed at a horizontal grid point interval of about 5 km for each meteorological element on the ground surface and a plurality of atmospheric pressure surfaces (altitudes) for thirty nine hours or seventy eight hours ahead. It is noted that, in the following description, each of a plurality of points where numerical values are forecast for each meteorological element is referred to as a forecast point for convenience.

It is noted that the meteorological element whose numerical value is forecast in the forecast data includes at least one of an air temperature on the ground surface, a sea surface calibration atmospheric pressure on the ground surface, a wind speed on the ground surface, a cloud amount on the ground surface, an ascending air current (vertical current) on each atmospheric pressure surface, an air temperature on each atmospheric pressure surface, a wind speed on each atmospheric pressure surface, and a relative humidity on each atmospheric pressure surface. Such a meteorological element is considered to contribute to determination of the nature of rainfall (Layered rainfall, convective rainfall, rainfall associated with typhoons, and the like). Specifically, when the weather radar observes (radar rainfall amount value corresponding to) rainfall and it is forecast (predicted) that the air temperature on the ground surface at the forecast point corresponding to the observation point is high and the rise is strong, it is estimated that the atmosphere is unstable and convective rainfall is likely to occur and that rainfall observed by the weather radar is convective rainfall. In addition, when the weather radar observes rainfall, if it is forecast (predicted) that the sea surface calibration atmospheric pressure on the ground surface at the forecast point corresponding to the observation point is low and the absolute value of the wind speed is large, it is estimated that rainfall observed by the weather radar is rainfall associated with a typhoon or a low atmospheric pressure.

Since the observation accuracy of the weather radar varies depending on the nature of rainfall, (forecast value included in) the above forecast data is considered to be useful as a feature value related to the observation accuracy of the weather radar.

It is noted that since the forecast data (numerical forecast data) is data including forecast values for each meteorological element several hours after the time of forecast, it is assumed in step S23 that forecast data (that is, forecast data including forecast value at observation time point) several hours before the time when the radar rainfall amount value included in the past weather data acquired in steps S21 and S22 is observed is acquired.

When the processing of step S23 is executed, the processing of step S24 corresponding to the processing of step S3 illustrated in FIG. 3 is executed.

Although FIG. 8 illustrates that the processing is executed in the order of steps S21 to S24, the order of the processing of steps S21 to S24 may be changed, or the processing of steps S21 to S24 may be executed in parallel.

Next, the learning data generation module 151a converts the past first weather data, the past second weather data, and the past forecast data acquired in steps S21 to S23 into data corresponding to a coordinate system defined for the composite rainfall amount data (step S25). It is noted that the processing of step S25 is processing corresponding to the processing of step S4 illustrated in FIG. 3, and thus a detailed description thereof will be omitted here.

In this case, a plurality of pieces of observation point data included in the past first and second weather data are converted into a plurality of pieces of coordinate point data corresponding to a plurality of coordinate points on a coordinate plane defined for the composite rainfall amount data.

Similarly, the forecast value (forecast point data) for each forecast point included in the past forecast data is converted into a plurality of coordinate point data corresponding to a plurality of coordinate points on a coordinate plane defined for the composite rainfall amount data. According to this, for example, at least one forecast value among the air temperature on the ground surface, the sea surface calibration atmospheric pressure on the ground surface, the wind speed on the ground surface, the cloud amount on the ground surface, the ascending air current on each atmospheric pressure surface, the air temperature on each atmospheric pressure surface, the wind speed on each atmospheric pressure surface, and the relative humidity on each atmospheric pressure surface for each forecast point included in the forecast data is converted into the forecast value for each coordinate point. It is assumed that the correspondence relationship (positional relationship) between the plurality of forecast points and the plurality of coordinate points in the coordinate plane defined for the composite rainfall amount data is set (recognized) in advance.

When the processing of step S25 is executed, the learning data generation module 151a acquires a plurality of feature values regarding the accuracy of the radar rainfall amount value included in the past first and second weather data based on the past first weather data, the past second weather data, and the past forecast data converted in step S25 (step S26).

It is noted that the feature values acquired based on the past first and second weather data among the plurality of features acquired in step S26 are as described in the first embodiment described above, and thus a detailed description thereof will be omitted here. Hereinafter, the feature value acquired based on the forecast data will be described in detail.

In step S26, the learning data generation module 151a acquires (extracts), for example, coordinate point data included in the past forecast data as a feature value. As described above, in a case where the coordinate point data included in the past forecast data is the forecast value of the air temperature on the ground surface, the sea surface calibration atmospheric pressure on the ground surface, the wind speed on the ground surface, the cloud amount on the ground surface, the ascending air current on each atmospheric pressure surface, the air temperature on each atmospheric pressure surface, the wind speed on each atmospheric pressure surface, and the relative humidity on each atmospheric pressure surface, the learning data generation module 151a acquires, as feature values, the air temperature on the ground surface for each coordinate point, the sea surface calibration atmospheric pressure on the ground surface, the absolute value of the horizontal wind speed on the ground surface, the cloud amount (for example, cloud amounts of lower layer, middle layer, and upper layer) on the ground surface, the air temperature on each atmospheric pressure surface (for example, 850 hPa atmospheric pressure surface, 700 hPa atmospheric pressure surface, and 500 hPa atmospheric pressure surface), the altitude of each atmospheric pressure surface, the absolute value of the horizontal wind speed on each atmospheric pressure surface, the relative humidity on each atmospheric pressure surface, the ascending air current on each atmospheric pressure surface, and the like.

In the present embodiment, in addition to the above feature values, a new feature value may be acquired (generated) based on the past forecast data (each coordinate point data).

Specifically, the learning data generation module 151a may acquire a difference between forecast values for each meteorological element between respective atmospheric pressure surfaces as a new feature value representing a stratification state of the atmosphere. In this case, the learning data generation module 151*a* can generate a feature value including, for example, a value obtained by subtracting a forecast value for each meteorological element on the 700 hPa surface from a forecast value for each meteorological element on the 850 hPa surface, and a value obtained by subtracting a forecast value for each meteorological element on the 500 hPa surface from a forecast value for each meteorological element on the 850 hPa surface. It is noted that, although the 850 hPa surface, the 700 hPa surface, and the 500 hPa surface are assumed as respective atmospheric pressure surface, forecast values for other atmospheric pressure surfaces may be used.

It is noted that, in the first and second weather radars described above, observation data is acquired at intervals of, for example, one minute (that is, in step S26, the feature values at one minute intervals are acquired based on the past first and second weather data). In general, the interval at which numerical values are forecast for each meteorological element included in the forecast data is longer than the interval at which observation data is acquired in the weather radar. In this case, the learning data generation module 151*a* may perform linear interpolation in the time direction using the coordinate point data (forecast value) at each time included in the forecast data, thereby acquiring, from the forecast data, feature values at intervals substantially equal to the feature values acquired based on the past first and second weather data.

In addition, there is a case where a positional deviation occurs in a forecast value (that is, forecast result) included in forecast data, but in consideration of the influence of the positional deviation, an average value of coordinate point data corresponding to each of the plurality of coordinate points centered on a coordinate point (grid point) at which a feature value is acquired may be acquired as a new feature value.

Although detailed description is omitted, it is assumed that a plurality of feature values corresponding to the ground rainfall amount value (one hour for which ground rainfall amount value is measured) are acquired in step S26, similarly to the first embodiment described above.

When the processing of step S26 is executed, the processing of steps S27 and S28 corresponding to the processing of steps S6 and S7 illustrated in FIG. 3 is executed.

Next, an example of a processing procedure of the composite rainfall amount data generation processing will be described with reference to a flowchart of FIG. 9.

In the composite rainfall amount data generation processing in the present embodiment, the processing of steps S31 and S32 corresponding to the processing of steps S11 and S12 illustrated in FIG. 4 described above is executed.

Next, the second data acquisition circuitry 13 acquires current forecast data (step S33). The current forecast data is acquired from, for example, an external apparatus that manages numerical forecast data (GPV). In step S33, forecast data (that is, forecast data including current forecast value forecasted several hours ago for each meteorological element) including a current forecast value is acquired.

Here, the above described past forecast data has been described as including the forecast value for each past meteorological element, but the current forecast data also includes the forecast value for each meteorological element that is the same as the past forecast data. That is, for example, when the past forecast data includes the forecast values of the air temperature on the ground surface, the sea surface calibration atmospheric pressure on the ground surface, the wind speed on the ground surface, the cloud amount on the ground surface, the ascending air current on each atmospheric pressure surface, the air temperature on each atmospheric pressure surface, the wind speed on each atmospheric pressure surface, and the relative humidity on each atmospheric pressure surface, the current forecast data similarly includes the forecast values of the air temperature on the ground surface, the sea surface calibration atmospheric pressure on the ground surface, the wind speed on the ground surface, the cloud amount on the ground surface, the ascending air current on each atmospheric pressure surface, the air temperature on each atmospheric pressure surface, the wind speed on each atmospheric pressure surface, and the relative humidity on each atmospheric pressure surface.

Although FIG. 9 illustrates that the processing is executed in the order of steps S31 to S33, the order of the processing of steps S31 to S33 may be changed, or the processing of steps S31 to S33 may be executed in parallel.

It is noted that the current first weather data, the current second weather data, and the current forecast data acquired in steps S31 to S33 are stored in the second data storage 14.

Next, the feature value acquisition module 152*a* converts the current first weather data, the current second weather data, and the current forecast data (current first weather data, current second weather data, and current forecast data stored in second data storage 14) acquired in steps S31 to S33 into data corresponding to a coordinate system defined for the composite rainfall amount data (step S34). It is noted that the processing in step S34 is similar to the processing in step S25 illustrated in FIG. 8 described above except that the past first weather data, the past second weather data, and the past forecast data are set as the current first weather data, the current second weather data, and the current forecast data, and thus a detailed description thereof will be omitted here.

When the processing of step S34 is executed, the feature value acquisition module 152*a* acquires a plurality of feature values related to accuracy of radar rainfall amount values included in the current first and second weather data based on the current first weather data, the current second weather data, and the current forecast data converted in step S34 (step S35). It is noted that the processing in step S35 is similar to the processing in step S26 illustrated in FIG. 8 described above except that the past first weather data, the past second weather data, and the past forecast data are set as the current first weather data, the current second weather data, and the current forecast data, and thus a detailed description thereof will be omitted here. That is, in step S35, a feature value having the same type as the feature value acquired in step S26 illustrated in FIG. 8 is acquired.

However, although it has been described in step S26 illustrated in FIG. 8 that the plurality of feature values corresponding to the ground rainfall amount value (one hour for which ground rainfall amount value is measured) are acquired, since the current first weather data, the current second weather data, and the current forecast data are acquired in the composite rainfall amount data generation processing, the plurality of feature values corresponding to the current (current time) are acquired in step S35.

Next, the processing of steps S36 and S37 corresponding to the processing of steps S15 and S16 illustrated in FIG. 4 described above is executed.

As described above, in the present embodiment, past forecast data including past forecast values regarding a plurality of meteorological elements provided by an external apparatus different from the information processing apparatus 10 is acquired, a plurality of feature values (first feature values) are acquired based on the past first and second weather data and the past forecast data, and a learned model is generated using the plurality of feature values. In addition, in the present embodiment, current forecast data including current forecast values regarding a plurality of meteorological elements provided by the above-described external apparatus is acquired, a plurality of feature values (second feature values) are acquired based on the current first and second weather data and the current forecast data, and composite rainfall amount data is generated using the plurality of feature values (and learned models).

In the present embodiment, with such a configuration, for example, it is possible to generate highly accurate composite rainfall amount data in consideration of the influence of each meteorological element (meteorological condition) on the observation accuracy of each weather radar (first and second weather radars).

It is noted that, in the present embodiment, it has been described that the forecast data includes at least one forecast value among the air temperature on the ground surface, the sea surface calibration atmospheric pressure on the ground surface, the wind speed on the ground surface, the cloud amount on the ground surface, the ascending air current on each atmospheric pressure surface, the air temperature on each atmospheric pressure surface, the wind speed on each atmospheric pressure surface, and the relative humidity on each atmospheric pressure surface. However, the forecast data may include data other than those described above.

Here, FIG. 10 illustrates a comparison result of the RMSE between the composite rainfall amount data generated in the comparative example of the first embodiment described above and the composite rainfall amount data generated in the present embodiment. Here, the RMSE for three rainfall cases of "local heavy rain", "typhoon", and "weather front" is illustrated. As illustrated in FIG. 10, the RMSE of the composite rainfall amount data generated in the present embodiment has a smaller value in all rainfall cases than the RMSE of the composite rainfall amount data generated in the comparative example of the first embodiment described above. That is, according to FIG. 10, as compared with the comparative example of the first embodiment described above, it can be said that the present embodiment can realize generation of highly accurate composite rainfall amount data in various rainfall cases by changing the composite rainfall amount value according to the meteorological element.

Third Embodiment

Next, a third embodiment will be described. In the present embodiment, detailed description of parts similar to those of the first and second embodiments described above will be omitted, and parts different from those of the first embodiment will be mainly described.

The present embodiment is different from the first and second embodiments described above in that a combination of feature values used to generate a learned model is selected from among a large number of feature values acquired based on past first and second weather data and past forecast data.

FIG. 11 is a block diagram illustrating an example of a configuration of an information processing apparatus according to the present embodiment. In FIG. 11, the same portions as those in FIG. 1 described above are denoted by the same reference numerals, and a detailed description thereof will be omitted.

As illustrated in FIG. 11, the learning module 151 included in the processing circuitry 15 of the information processing apparatus 10 according to the present embodiment includes a feature value selection module 151c.

Here, the learning data generation module 151a acquires a plurality of feature values based on the past first weather data, the past second weather data, and the past forecast data, but the feature value selection module 151c operates in cooperation with the learning data generation module 151a and the learning processing module 151b, and selects a combination (that is, feature value capable of generating learned model with high accuracy) of feature values useful for generating the learned model from among the plurality of feature values acquired by the learning data generation module 151a.

In the present embodiment, the learning processing module 151b generates a learned model based on the learning data generated using the feature value selected by the feature value selection module 151c in this manner (executes learning processing using the learning data).

In addition, in the present embodiment, the feature value acquisition module 152a acquires (feature value of the same type as) the feature value selected by the feature value selection module 151c based on the current first weather data, the current second weather data, and the current forecast data.

It is noted that since a hardware configuration of the information processing apparatus 10 according to the present embodiment is similar to that of the first embodiment described above, a detailed description thereof will be omitted here.

Hereinafter, the operation of the information processing apparatus 10 according to the present embodiment will be described. Here, similarly to the first and second embodiments described above, model generation processing and composite rainfall amount data generation processing will be described.

First, an example of a processing procedure of the model generation processing will be described with reference to a flowchart of FIG. 12.

In the model generation processing in the present embodiment, processing in steps S41 to S46 corresponding to the processing in steps S21 to S26 illustrated in FIG. 8 described above is executed.

Here, in step S46, as described in the first and second embodiments described above, a plurality of feature values are acquired based on the past first weather data, the past second weather data, and the past forecast data. Hereinafter, the processing in steps S47 to S49 is executed for each combination of any number of feature values among the plurality of feature values. Here, a combination of the feature values to be processed in steps S47 and S48 is referred to as a target feature value.

First, the learning data generation module 151a generates learning data (hereinafter, referred to as first learning data) based on the ground rainfall amount value and the target feature value included in the past ground rainfall amount data acquired in step S44 (step S47). It is noted that the processing of step S47 is similar to the processing of step S6 illustrated in FIG. 3 and step S27 illustrated in FIG. 8 described above except that a plurality of feature values are set as the target feature value, and thus a detailed description thereof will be omitted here.

Next, the learning processing module 151b executes learning processing using the first learning data generated in step S47 (step S48). It is noted that the processing of step S48 is similar to step S7 illustrated in FIG. 3 and step S28 illustrated in FIG. 8 described above except that the learning data used for learning is different, and thus a detailed description thereof will be omitted here. That is, the learned model is generated by executing the processing of step S48. It is noted that the learned model is as described in the first and second embodiments described above, and thus a detailed description thereof will be omitted here. Hereinafter, the learned model generated by executing the processing of step S48 is referred to as a feature value selection model.

When the processing of step S48 is executed, the feature value selection module 151c executes evaluation processing on the feature value selection model (step S49).

Hereinafter, the processing of step S49 will be described. In step S49, a part of the learning data generated in step S47 described above is used as data for evaluation (hereinafter, referred to as evaluation data) for the feature value selection model.

Specifically, the feature value selection module 151c inputs a target feature value included in the evaluation data to the feature value selection model to acquire a parameter (for example, radar number) output from the feature value selection model, and assigns a radar rainfall amount value observed by a weather radar (first or second weather radar) to which the radar number is assigned as a composite rainfall amount value to each coordinate point to generate composite rainfall amount data. Furthermore, the feature value selection module 151c evaluates the feature value selection model by calculating the RMSE of the generated composite rainfall amount data with the ground rainfall amount value included in the past ground rainfall amount data acquired in step S44 as a true value. It is noted that the generation of the composite rainfall amount data and the evaluation by the RMSE are as described in the first embodiment described above, and thus, the detailed description thereof will be omitted here.

It is noted that, as described above, in a case where a part of the first learning data is used as the evaluation data, the processing in step S48 described above is executed using the first learning data excluding the evaluation data. In addition, although it has been described here that a part of the first learning data is used as the evaluation data, the evaluation data (data corresponding to first learning data) may be prepared separately from the first learning data.

The RMSE calculated by executing the processing in step S49 described above is stored inside the feature value selection module 151c as an evaluation value of the target feature value.

When the processing of step S49 is executed, it is determined whether the processing of steps S47 to S49 has been executed for all combinations of feature values (step S50).

When it is determined that the processing has not been executed for all the combinations (NO in step S50), the processing returns to step S47 and the processing is repeated. In this case, the processing is executed using a combination of feature values different from the target feature value as a new target feature value.

That is, in the present embodiment, processing of generating a plurality of feature value selection models (learned models) based on learning data generated while changing a combination of a plurality of feature values acquired in step S46 and evaluating the plurality of generated feature value selection models (that is, each combination of feature values) is executed.

On the other hand, when it is determined that the processing has been executed for all the combinations (YES in step S50), the feature value selection module 151c selects one combination of feature values (that is, some or all of the plurality of feature values acquired in step S46) based on the evaluation value for each combination of feature values (target feature value) stored in the feature value selection module 151c (step S51). As described above, in a case where the evaluation value is the RMSE, the feature value selection module 151c selects a combination of feature values having the smallest RMSE. It is noted that the combination of the feature values selected in step S51 is notified to (feature value acquisition module 152a included in) the composition module 152.

When the processing of step S51 is executed, the learning data generation module 151a generates learning data (hereinafter, referred to as second learning data) based on the past ground rainfall amount data acquired in step S44 and the combination of the feature value selected in step S51 (step S52). The second learning data generated in step S52 is passed to the learning processing module 151b.

Next, the learning processing module 151b executes learning processing using the above-described second learning data (step S53). It is noted that the processing of step S53 is similar to the processing of step S7 illustrated in FIG. 3 and the processing of step S28 illustrated in FIG. 8 described above, and thus a detailed description thereof will be omitted here.

It is noted that, although it has been described here that the second learning data is newly generated in step S52, since the second learning data corresponds to the first learning data generated in the processing of step S47 executed for the combination of the feature values selected in step S51 described above, the learning processing module 151b may execute the processing of step S53 using the already generated first learning data. That is, the processing of step S52 may be omitted.

In addition, although it has been described here that each evaluation value of the combination of the feature values is the RMSE, the evaluation value may be a value based on an index other than the RMSE. Specifically, the evaluation value may be, for example, a correlation coefficient, a total rainfall ratio, an average error, an accuracy rate of a feature value selection model, or the like when the ground rainfall amount data is used as a reference. It is noted that the accuracy rate of the feature value selection model refers to, for example, a ratio of a correct answer with respect to the entire measurement points (or coordinate points) of the ground rainfall amount value in a case where a case where a radar number of a weather radar that has observed a radar rainfall amount value close to the ground rainfall amount value is output as a correct answer in a feature value selection model that estimates (predicts) and outputs a radar number (identification information assigned to first or second weather radar) of a weather radar that has observed a radar rainfall amount value close to the ground rainfall amount value.

Furthermore, in the example illustrated in FIG. 12, it has been described that the processing of steps S47 to S49 is executed for all combinations of feature values (that is, all combinations of feature values are evaluated in round-robin manner). However, for example, in a case where the number of feature values acquired in step S46 is large, it is assumed that the processing amount becomes enormous when all combinations are evaluated. In such a case, for example, a feature value selection model capable of calculating (outputting) an importance level of each feature value by applying a known method such as random forest or gradient boosting decision tree in the learning processing executed in step S48 may be generated. It is noted that the weight degree is an index indicating at what rate each feature value is used for estimation (prediction) in the learned model. It is noted that, in a case where the gradient boosting decision tree is applied, for example, a value (that is, ratio) obtained by dividing the number of feature values used for branching of each decision tree constituting the gradient boosting decision tree by the total number of branches can be set as the importance level.

In such a configuration, for example, a cycle of generating and evaluating a feature value selection model using all feature values, generating and evaluating a feature value selection model by excluding a feature value having a low importance level output from the feature value selection model, and generating and evaluating a feature value selection model by further excluding a feature value having a low importance level output from the feature value selection model is repeatedly performed. According to the above description, it is possible to select (search for) a combination of feature values having the highest evaluation value (having the smallest value in the case of RMSE) while excluding feature values having the low importance level (estimated) without comprehensively executing evaluation processing for all combinations of feature values.

Next, a processing procedure of the composite rainfall amount data generation processing will be described. It is noted that, here, for convenience, a description will be given with reference to FIG. 9 described above.

In the composite rainfall amount data generation processing in the present embodiment, the processing of steps S31 to S34 illustrated in FIG. 9 described above is executed.

Here, in the present embodiment, when the processing of step S51 illustrated in FIG. 12 is executed as described above, the feature value selection module 151c notifies the feature value acquisition module 152a of the combination of the feature values selected in step S51.

As a result, the feature value acquisition module 152a acquires a plurality of feature values (that is, feature value having the same type as selected feature value) corresponding to the combination of the feature values based on the current first weather data, the current second weather data, and the current forecast data according to the notification (combination of feature values) from the feature value selection module 151c (step S35).

When the processing of step S35 is executed, the processing of steps S36 and S37 is executed.

That is, the composite rainfall amount data generation processing executed in the present embodiment is the same processing as the second embodiment described above except that the type of the acquired feature value is different as described above.

As described above, in the model generation processing in the present embodiment, for example, a plurality of feature value selection models (learned models) are generated based on the first learning data generated while changing a combination of the plurality of feature values (first feature values) acquired based on the past first weather data, the past second weather data, and the past forecast data, the plurality of feature value selection models are evaluated using a part of the generated first learning data or evaluation data corresponding to the learning data, a combination of feature values (third feature value) which is a part or all of the plurality of feature values is selected based on the evaluation result (for example, evaluation index of composite rainfall amount data such as RMSE), and a learned model is generated based on the second learning data generated based on the selected combination of feature values. In addition, in the composite rainfall amount data generation processing in the present embodiment, the feature value (fourth feature value) corresponding to the feature value selected as described above based on the current first weather data, the current second weather data, and the current forecast data is acquired, a parameter (for example, radar number) output from the learned model is acquired by inputting the acquired feature value to the learned model, and the composite rainfall amount data is generated based on the parameter.

Here, in the first and second embodiments described above, since the composite rainfall amount data can be generated in consideration of a large number of feature values, it is considered that the accuracy of the composite rainfall amount data is improved. However, among the large number of feature values, there is a possibility that not only the feature value having the low degree of contribution to the accuracy improvement of the composite rainfall amount data, but also feature values that hinder the accuracy improvement are included.

Meanwhile, in the present embodiment, by selecting (combination of) the feature value capable of improving the accuracy of the composite rainfall amount data (that is, learned model) as described above, it is possible to generate the composite rainfall amount data with higher accuracy.

Here, FIG. 13 illustrates a comparison result of the RMSE among the composite rainfall amount data generated in the comparative example of the first embodiment described above, the composite rainfall amount data generated in the second embodiment described above, and the composite rainfall amount data generated in the present embodiment. Here, the RMSE for three rainfall cases of "local heavy rain", "typhoon", and "weather front" is illustrated, and as illustrated in FIG. 13, the RMSE of the composite rainfall amount data generated in the present embodiment has a smaller value in all rainfall cases than the RMSE of the composite rainfall amount data generated in the comparative example of the first embodiment and the second embodiment described above. That is, according to FIG. 13, as compared with the comparative example of the first embodiment described above and the second embodiment described above, it can be said that the present embodiment can realize generation of composite rainfall amount data with higher accuracy in various rainfall cases.

It is noted that, in the present embodiment, it has been mainly described that the configuration of selecting (combination of) the feature value is applied (that is, present embodiment is applied to second embodiment) to the second embodiment described above, but the present embodiment may be applied to the first embodiment.

Fourth Embodiment

Next, a fourth embodiment will be described. In the present embodiment, detailed description of parts similar to those of the first to third embodiments described above will be omitted, and parts different from those of the first to third embodiments will be mainly described. It is noted that a configuration of an information processing apparatus according to the present embodiment is similar to that of the first embodiment described above, and thus the same will be appropriately described with reference to FIG. 1 and the like.

In the first to third embodiments described above, the configuration using the first weather data including the radar rainfall amount value observed by the first weather radar and the second weather data including the radar rainfall amount value observed by the second weather radar has been described. However, the present embodiment is different from the first to third embodiments in that, instead of the second weather data, for example, data (hereinafter, referred to as external rainfall amount data) including a composite rainfall amount value (external rainfall amount value) obtained by composing the radar rainfall amount value observed by the second weather radar and the radar rainfall amount value observed by a third weather radar different from the first and second weather radars is used. It is noted that, as an example of the external rainfall amount data, for example, composite rainfall amount data generated in a radar network operated by the Meteorological Agency or the the Ministry of Land, Infrastructure, Transport and Tourism is assumed. In general, for example, it is not assumed that a radar rainfall amount value observed by the first weather radar is composed with a composite rainfall amount value included in the above-described external rainfall amount data. However, in the present embodiment, it is considered that composite rainfall amount data with higher accuracy is generated by composing such a radar rainfall amount value and a composite rainfall amount value.

Hereinafter, the operation of the information processing apparatus 10 according to the present embodiment will be described. Here, similarly to the first to third embodiments described above, the model generation processing and the composite rainfall amount data generation processing will be described.

Figure 14:
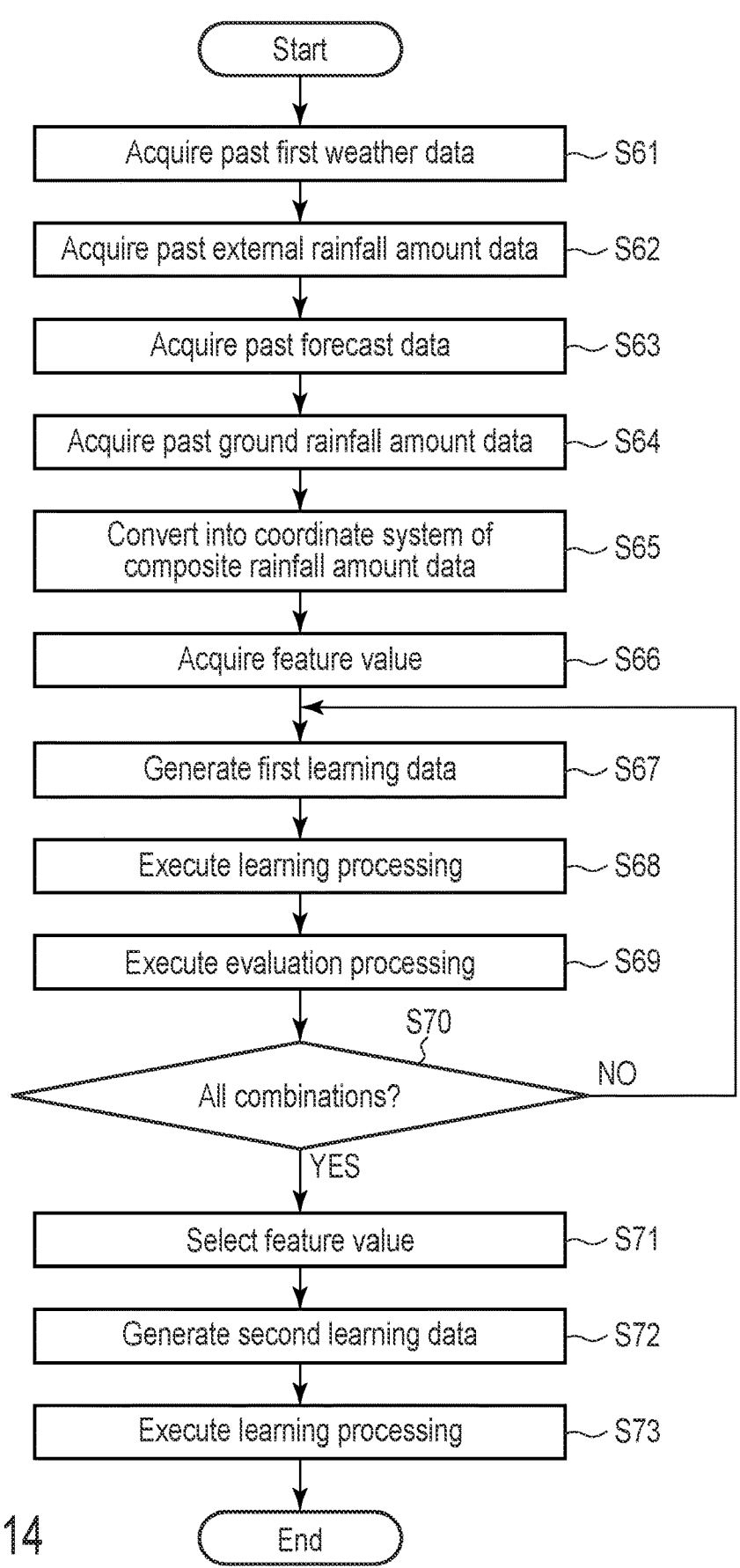
FIG. 14 is a flowchart illustrating an example of a processing procedure of model generation processing according to a fourth embodiment.

First, an example of a processing procedure of the model generation processing will be described with reference to a flowchart of FIG. 14.

In the model generation processing in the present embodiment, the processing in step S61 corresponding to the processing in step S41 illustrated in FIG. 12 described above is executed.

Next, the first data acquisition circuitry 11 acquires past external rainfall amount data (step S62). The past external rainfall amount data acquired in step S62 includes, for example, a past composite rainfall amount value in a predetermined period at each grid point (each observation point) defined by each latitude and each longitude. This composite rainfall amount value is a rainfall amount value obtained by composing radar rainfall amount values observed by each of the plurality of weather radars. The past external rainfall amount data may be acquired from, for example, an external apparatus (apparatus other than information processing apparatus 10 and first weather radar) that manages the external rainfall amount data, or may be stored (held) in advance inside the information processing apparatus 10.

Next, the processing of steps S63 to S66 corresponding to the processing of steps S43 to S46 illustrated in FIG. 12 described above is executed.

Hereinafter, the feature value acquired in step S66 will be described. Here, a plurality of feature values may be acquired based on the past first weather data acquired in step S61, the past external rainfall amount data acquired in step S62, and the past forecast data acquired in step S63, but here, feature values other than the feature values described in the first to third embodiments will be mainly described.

First, in the present embodiment, the learning data generation module 151a can acquire a composite rainfall amount value included in the external rainfall amount data as a feature value. Furthermore, in the first embodiment described above, it has been described that the spatial average value, the standard deviation (variance value), the maximum value, and the like of the radar rainfall amount values included in the first weather data are acquired (generated) as the feature value representing the rainfall distribution, but the learning data generation module 151a can similarly acquire the spatial average value, the standard deviation (variance value), the maximum value, and the like of the composite rainfall amount values included in the external rainfall amount data. In addition, the feature value representing the rainfall distribution may include a ratio of coordinate points (grid points) at which rainfall is observed in the external rainfall amount data, and the like.

In addition, as described above, assuming that the composite rainfall amount value included in the external rainfall amount data is the rainfall amount value obtained by composing the radar rainfall amount values observed by the plurality of weather radars, a distance between (position of) each of the weather radars and (position corresponding to) the coordinate point on the coordinate plane defined in the composite rainfall amount data to be generated in the present embodiment may be acquired (generated) as the feature value. In addition, an average value of distances between each of the plurality of weather radars that have observed a radar rainfall amount value that is a basis of a composite rainfall amount value included in the external rainfall amount data and a coordinate point may be used as the feature value. Such a feature value is considered to be useful as an index for estimating the observation accuracy of the composite rainfall amount value at each coordinate point included in the external rainfall amount data. It is noted that the position of each of the plurality of weather radars that have observed the radar rainfall amount value that is the basis of the composite rainfall amount value included in the external rainfall amount data used to acquire this feature value may be included in the external rainfall amount data or may be stored (held) in advance in the information processing apparatus 10.

Furthermore, the difference between the feature values described above may be acquired as a new feature value. In this case, the learning data generation module 151a acquires, for example, a difference between a radar rainfall amount value included in the first weather data and a composite rainfall amount value included in the external rainfall amount data, and a difference between a spatial average value of rainfall amount values, a standard deviation, a maximum value, and a ratio of coordinate points at which rainfall is observed between the first weather data and the external rainfall amount data, as feature values. In addition, the learning data generation module 151a may acquire, as a feature value, a difference between a distance between the first weather radar and a coordinate point and an average value of distances between each of the plurality of weather radars that have observed a radar rainfall amount value that is a basis of a composite rainfall amount value included in the external rainfall amount data and a coordinate point.

Here, FIG. 15 illustrates a list of feature values that can be acquired based on the past first weather data, the past external rainfall amount data, and the past forecast data in the present embodiment.

It is noted that, since each of the feature values illustrated in FIG. 15 has already been described in the first to third embodiments and the present embodiment described above, detailed description thereof is omitted here, but FIG. 15 illustrates, for example, nine feature values acquired based on weather data (first weather data). In the "spatial average value, standard deviation, and maximum value of radar rainfall amount values" in FIG. 15, the spatial average value, the standard deviation, and the maximum value are each counted as one feature value.

Furthermore, in FIG. 15, for example, eleven feature values acquired based on the external rainfall amount data are illustrated. In the "spatial average value, standard deviation, and maximum value of composite rainfall amount values" in FIG. 15, the spatial average value, the standard deviation, and the maximum value are each counted as one feature value. In addition, regarding "a distance between each of the plurality of weather radars that have observed a radar rainfall amount value that is a basis and the coordinate point" in FIG. 15, it is assumed that the number of the plurality of weather radars is five, and a distance between one weather radar among the five weather radars and the coordinate point is counted as one feature value. That is, "the distance between each of the plurality of weather radars that have observed the radar rainfall amount value that is the basis and the coordinate point" represents five feature values.

Furthermore, in FIG. 15, for example, six feature values acquired based on a difference between the weather data and the external rainfall amount data are illustrated. In a "difference in the spatial average value, the standard deviation, and the maximum value of the rainfall amount values" in FIG. 15, a difference in the spatial average value, a difference in the standard deviation, and a difference in the maximum value are each counted as one feature value.

In addition, in FIG. 15, for example, six feature values acquired based on forecast data (ground surface) are illustrated. In the "cloud amount (lower layer, middle layer, upper layer)" in FIG. 15, the cloud amount of the lower layer, the cloud amount of the middle layer, and the cloud amount of the upper layer are each counted as one feature value.

In addition, FIG. 15 illustrates fifteen feature values acquired based on, for example, forecast data (atmospheric pressure surface). In "the ascending air current, the air temperature, the altitude, the absolute value of horizontal wind speed, the relative humidity of the 850 hPa surface" in FIG. 15, each of the ascending air current, the air temperature, the altitude, the absolute value of the horizontal wind speed, and the relative humidity is counted as one feature value. The same applies to "the ascending air current, the air temperature, the altitude, the absolute value of horizontal wind speed, the relative humidity of the 700 hPa surface" and "the ascending air current, the air temperature, the altitude, the absolute value of horizontal wind speed, the relative humidity of the 500 hPa surface" in FIG. 15.

FIG. 15 illustrates ten feature values acquired based on forecast data (differences between atmospheric pressure surfaces). In "a difference between the ascending air currents, the air temperatures, the altitudes, the absolute values of horizontal wind speed, and the relative humidities of the 850 hPa surface and the 700 hPa surface" in FIG. 15, a difference between the ascending air currents, a difference between the air temperatures, a difference between the altitudes, a difference between the absolute values of horizontal wind speed, and a difference between relative humidities are each counted as one feature value. The same applies to "a difference between the ascending air currents, the air temperatures, the altitudes, the absolute values of horizontal wind speed, the relative humidities of the 850 hPa surface and the 500 hPa surface" in FIG. 15.

That is, FIG. 15 illustrates that a total of fifty seven feature values are acquired based on the past first weather data, the past external rainfall amount data, and the past forecast data in the present embodiment.

It is noted that, although it has been described here that fifty seven feature values are acquired, it is assumed that the feature value acquired in the present embodiment includes at least the "radar rainfall amount value", the "distance between the weather radar and the coordinate point", the "flag value of the radar rainfall amount value calculation method", the "integrated value of the rainfall attenuation amount" acquired based on the weather data (first weather data), and the "difference in rainfall amount value" acquired based on a difference between the weather data and the external rainfall amount data, and other features may be appropriately selected. In addition, the feature value acquired in the present embodiment may include a feature value other than the feature value illustrated in FIG. 15.

When the processing of step S66 is executed, the processing of steps S67 to S71 corresponding to the processing of steps S47 to S51 illustrated in FIG. 12 is executed.

Here, FIG. 16 illustrates an example of (combination of) the feature values selected in step S71. In FIG. 16, seventeen feature values selected using the importance level described in the third embodiment are illustrated together with the importance level.

When the processing of step S71 is executed, the processing of steps S72 and S73 corresponding to the processing of steps S52 and S53 illustrated in FIG. 12 are executed.

Next, an example of a processing procedure of the composite rainfall amount data generation processing will be described with reference to a flowchart of FIG. 17.

In the composite rainfall amount data generation processing in the present embodiment, the processing of step S81 corresponding to the processing of step S31 illustrated in FIG. 9 described above is executed.

Next, the second data acquisition circuitry 13 acquires current external rainfall amount data (step S82). The current external rainfall amount data acquired in step S82 includes a current composite rainfall amount value at each grid point (each observation point) defined by each latitude and each longitude, similarly to the past external rainfall amount data described above. It is assumed that the current external rainfall amount data is acquired from, for example, an external apparatus (apparatus other than information processing apparatus 10 and first weather radar) that manages the external rainfall amount data.

When the processing of step S82 is executed, the processing of step S83 corresponding to the processing of step S33 illustrated in FIG. 9 is executed.

Figure 17:
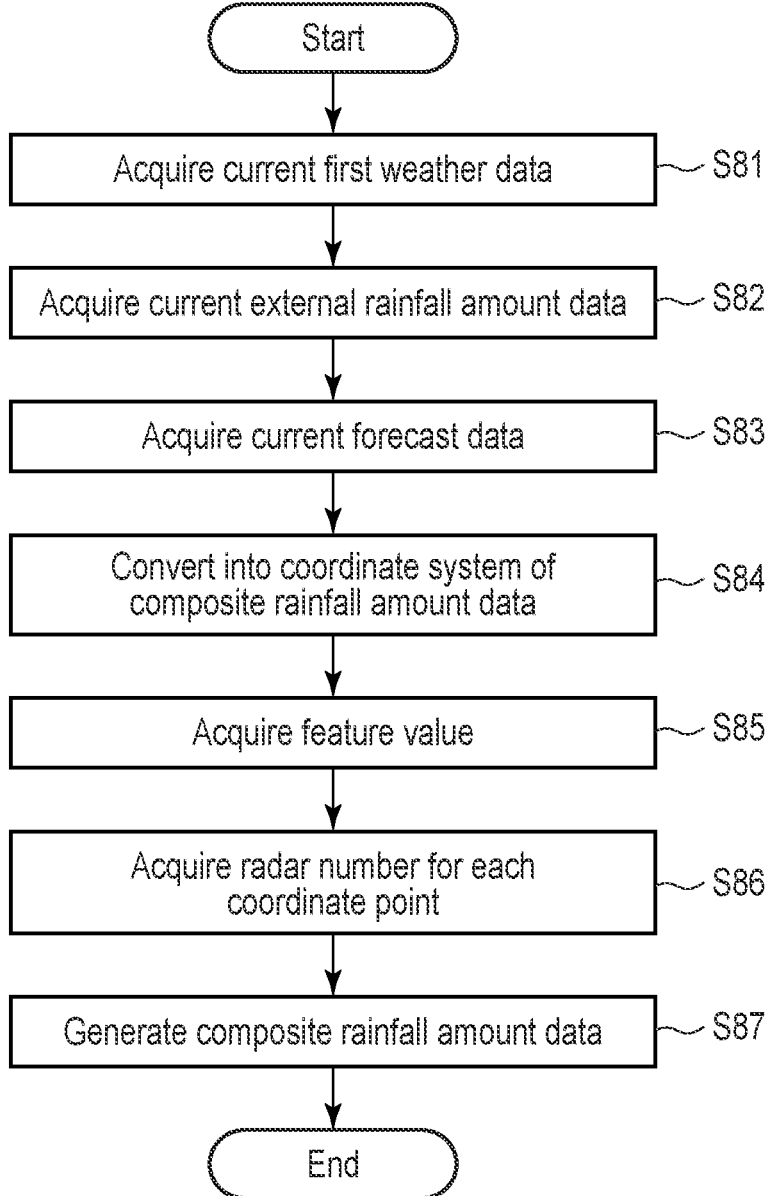
FIG. 17 is a flowchart illustrating an example of a processing procedure of composite rainfall amount data generation processing.

Although FIG. 17 illustrates that the processing is executed in the order of steps S81 to S83, the order of the processing of steps S81 to S83 may be changed, or the processing of steps S81 to S83 may be executed in parallel.

It is noted that the current first weather data, the current external rainfall amount data, and the current forecast data acquired in steps S81 to S83 are stored in the second data storage 14.

Next, the processing of steps S84 to S87 corresponding to the processing of steps S34 to S37 illustrated in FIG. 9 is executed. It is noted that, in step S85, a plurality of feature values corresponding to the combination of the feature values are acquired according to a notification from the feature value selection module 151$c$ (combination of feature values selected in step S71 illustrated in FIG. 14 described above).

That is, the composite rainfall amount data generation processing executed in the present embodiment is the same processing as the third embodiment described above except that the type of the acquired feature value is different as described above.

As described above, in the present embodiment, instead of the second weather data (past and current second weather data) in the first to third embodiments described above, with the configuration using the external rainfall amount data including the composite rainfall amount value obtained by composing the radar rainfall amount values observed by the plurality of weather radars (for example, second and third weather radars), there is a possibility that it is possible to generate the composite rainfall amount data with higher accuracy than a configuration of simply composing the radar rainfall amount value observed by the first weather radar and the radar rainfall amount value observed by the second weather radar.

Here, FIG. 18 illustrates a comparison result of the RMSE among the rainfall amount data generated using only the weather data (for example, first weather data), the rainfall amount data generated using only the external rainfall amount data, and the composite rainfall amount data generated in the present embodiment. Here, the RMSE for six rainfall cases of "local heavy rain 1", "local heavy rain 2", "typhoon 1", "typhoon 2", "weather front 1", and "weather front 2" is illustrated. Furthermore, in FIG. 18, in order to generate the composite rainfall amount data in the present embodiment, a case is assumed in which three learned models generated by applying each of the random forest, the support vector machine, and the gradient boosting decision tree are used as a machine learning algorithm. It is noted that, in the support vector machine, it is assumed that each feature value is standardized as preprocessing.

First, since the external rainfall amount data includes the composite rainfall amount value obtained by composing the radar rainfall amount values observed by the plurality of weather radars as described above, the RMSE of the rainfall amount data generated using only the external rainfall amount data has a smaller value than the RMSE of the rainfall amount data generated using only the weather data including the radar rainfall amount value observed by the single weather radar.

On the other hand, according to FIG. 18, even when any one of the random forest, the support vector machine, and the gradient boosting decision tree is applied as the machine learning algorithm for generating the learned model, the RMSE of the composite rainfall amount data generated in the present embodiment has a substantially smaller value than the RMSE of the rainfall amount data generated using only the external rainfall amount data although there is an exception in some rainfall cases. That is, it can be said that the configuration in the present embodiment contributes to improvement of the accuracy of the composite rainfall amount data.

However, focusing on the difference of the machine learning algorithm, the RMSE of the composite rainfall amount data (hereinafter, referred to as composite rainfall amount data to which random forest is applied) generated using the learned model generated by applying the random forest has a larger value than the RMSE of the rainfall amount data generated using only the external rainfall amount data in the rainfall case of the "local heavy rain 2", for example, and it cannot be said that the RMSE is highly accurate. That is, it is considered that the composite rainfall amount data to which the random forest is applied has lower stability of accuracy than the composite rainfall amount data (hereinafter, referred to as composite rainfall amount data to which support vector machine and gradient boosting decision tree are applied) generated using the learned model generated by applying the support vector machine and the gradient boosting decision tree.

In addition, FIG. 19 illustrates a display example of the composite rainfall amount data to which the random forest is applied. FIG. 20 illustrates a display example of the composite rainfall amount data to which the support vector machine is applied. FIG. 21 illustrates a display example of the composite rainfall amount data to which the gradient boosting decision tree is applied. It is noted that FIGS. 19 to

21 illustrate an example in which the composite rainfall amount data is displayed on the map by color-coding the rainfall amount value assigned to each coordinate point for each class.

Comparing FIGS. 19 to 21, in the composite rainfall amount data to which the support vector machine illustrated in FIG. 20 is applied, a radial distribution is visually recognized on the left side (that is, there is visual discomfort), whereas in the composite rainfall amount data to which the random forest illustrated in FIG. 19 is applied and the composite rainfall amount data to which the gradient boosting decision tree illustrated in FIG. 21 is applied, there is little visual sense of discomfort.

That is, according to FIGS. 19 to 21, it can be said that a difference occurs in the composite rainfall amount data to which each machine learning algorithm is applied from the viewpoint of visual quality, and in particular, the composite rainfall amount data to which the random forest and the gradient boosting decision tree are applied is less likely to cause visual discomfort as compared with the composite rainfall amount data to which the support vector machine is applied.

From the viewpoint of the stability of the accuracy and the visual quality described above, the gradient boosting decision tree is more suitable as the machine learning algorithm for generating the learned model in the present embodiment than the random forest and the support vector machine.

In the present embodiment, it has been mainly described that the external rainfall amount data is used (that is, present embodiment is applied to third embodiment) instead of the second weather data in the third embodiment, but the present embodiment may be applied to the first embodiment.

Fifth Embodiment

Next, a fifth embodiment will be described. In the present embodiment, detailed description of parts similar to those of the first to fourth embodiments described above will be omitted, and parts different from those of the first to fourth embodiments will be mainly described.

In the first to fourth embodiments described above, an information processing apparatus configured as an apparatus separate from a weather radar (for example, first weather radar) that observes a radar rainfall amount value has been described. However, the present embodiment is different from the first to fourth embodiments in that the information processing apparatus is incorporated in a weather radar.

FIG. 22 illustrates an example of a configuration of the weather radar according to the present embodiment. As illustrated in FIG. 22, the weather radar 30 includes the information processing apparatus 10, and further includes an observation circuitry 31, a signal processing circuitry 32, and a data reception circuitry 33. It is noted that the weather radar 30 illustrated in FIG. 22 is assumed to be used as, for example, the first weather radar described above, but may be used as the second weather radar.

The observation circuitry 31 emits radio waves via an antenna (not illustrated), and receives a reflected wave of the radio waves reflected by raindrops.

The signal processing circuitry 32 acquires observation data at each observation point by processing (signal of) the reflected wave received by the observation circuitry 31, and generates weather data (for example, radar rainfall amount value or the like) based on the observation data. The weather data generated by the signal processing circuitry 32 in this manner is output to the information processing apparatus 10, for example, as the current first weather data described above. It is noted that the weather data generated by the signal processing circuitry 32 may be stored (held) in the information processing apparatus 10 to be used as the past first weather data.

The data reception circuitry 33, receives various data used in the information processing apparatus 10, such as the second weather data, the forecast data, and the external rainfall amount data described above. The second weather data, the forecast data, and the external rainfall amount data received by the data reception circuitry 33 are output to the information processing apparatus 10. It is noted that the data reception circuitry 33 may be included in the first data acquisition circuitry 11 and the second data acquisition circuitry 13 included in the information processing apparatus 10.

The information processing apparatus 10 has a configuration similar to that of the information processing apparatus described in the first to fourth embodiments described above.

It is noted that the present embodiment is similar to the first to fourth embodiments described above except that the information processing apparatus 10 is incorporated in the weather radar 30, and thus the description of the operation of the weather radar including the information processing apparatus 10 is omitted.

In the present embodiment, even the weather radar 30 (radar apparatus) including the information processing apparatus described in the first to fourth embodiments described above can generate highly accurate composite rainfall amount data as described in the first to fourth embodiments.

According to at least one embodiment described above, it is possible to generate highly accurate composite rainfall amount data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

With regard to the above-described embodiments, the following supplementary notes are further disclosed.

(1)

An information processing apparatus including a processing circuitry configured to:

acquire first weather data in a first time zone including a first radar rainfall amount value observed in the first time zone in a first weather radar, second weather data in the first time zone including a second radar rainfall amount value observed in the first time zone in a second weather radar different from the first weather radar, and ground rainfall amount data in the first time zone including a ground rainfall amount value measured in the first time zone in a ground rainfall meter;

acquire, based on the first and second weather data in the first time zone, a plurality of first feature values related to accuracy of the first and second radar rainfall amount values included in the first and second weather data in the first time zone;

generate learning data based on the ground rainfall amount value included in the ground rainfall amount data in the first time zone and the plurality of acquired first feature values;

generate, based on the generated learning data, a learned model learned so as to output a parameter for estimating a rainfall amount value corresponding to the ground rainfall amount value included in the ground rainfall amount data in the first time zone when the plurality of first feature values are input;

acquire first weather data in a second time zone including a first radar rainfall amount value observed in the second time zone after the first time zone in the first weather radar and second weather data in the second time zone including a second radar rainfall amount value observed in the second time zone in the second weather radar;

acquire, based on the first and second weather data in the second time zone, a plurality of second feature values related to accuracy of the first and second radar rainfall amount values included in the first and second weather data in the second time zone;

acquire a parameter output from the learned model by inputting the plurality of acquired second feature values to the generated learned model; and compose, based on the acquired parameter, the first and second radar rainfall amount values included in the first and second weather data in the second time zone to generate composite rainfall amount data.

(2)

The information processing apparatus according to (1), wherein the learning data includes the plurality of first feature values and identification information for identifying the first or second weather radar that has observed a radar rainfall amount value close to the ground rainfall amount value included in the ground rainfall amount data in the first time zone, wherein the learned model performs learning so as to output the identification information as the parameter when the plurality of first feature values are input, and wherein the composite rainfall amount data includes the first or second radar rainfall amount value observed in the second time zone in the first or second weather radar identified by the identification information output as the parameter from the learned model when the plurality of second feature values are input.

(3)

The information processing apparatus according to (1), wherein the learning data includes the plurality of first feature values and identification information for identifying the first or second weather radar that has observed a radar rainfall amount value close to the ground rainfall amount value included in the ground rainfall amount data in the first time zone, wherein the learned model performs learning so as to output, for each of the first and second weather radars, a probability of observing the radar rainfall amount value close to the ground rainfall amount value as the parameter when the plurality of first feature values are input, and wherein the composite rainfall amount data is generated by composing the first and second radar rainfall amount values included in the first and second weather data in the second time zone with a probability output for each of the first and second weather radars as the parameter from the learned model when the plurality of second feature values are input as a weight.

(4)

The information processing apparatus according to (1), wherein the learning data includes the plurality of first feature values and the ground rainfall amount value included in the ground rainfall amount data in the first time zone, wherein the learned model performs learning so as to output an estimated rainfall amount value corresponding to the ground rainfall amount value as the parameter when the plurality of first feature values are input, and wherein the composite rainfall amount data includes an estimated rainfall amount value output as the parameter from the learned model when the plurality of second feature values are input.

(5)

The information processing apparatus according to any one of (1) to (4), wherein the first weather radar is configured to observe a first radar rainfall amount value at a first observation point of the first weather radar calculated based on a first reflected wave of a radio wave transmitted from the first weather radar, wherein the second weather radar is configured to observe a second radar rainfall amount value at a second observation point of the second weather radar calculated based on a second reflected wave of a radio wave transmitted from the second weather radar, wherein the first weather data includes, in addition to the first radar rainfall amount value, at least one of reception power, a reflectivity factor, a Doppler velocity, a Doppler spectrum width, a differential reflectivity, a correlation coefficient between polarizations, a differential phase, a specific differential phase, a flag value indicating a calculation method of the first radar rainfall amount value, and an integrated value of a rainfall attenuation amount at the first observation point, and wherein the second weather data includes, in addition to the second radar rainfall amount value, at least one of reception power, a reflectivity factor, a Doppler velocity, a Doppler spectrum width, a differential reflectivity, a correlation coefficient between polarizations, a differential phase, a specific differential phase, a flag value indicating a calculation method of the second radar rainfall amount value, and an integrated value of a rainfall attenuation amount at the second observation point.

(6)

The information processing apparatus according to (5), wherein the plurality of first and second feature values include at least the first and second radar rainfall amount values, a distance from the first and second weather radars to the first and second observation points, a flag value indicating a calculation method of the first and second radar rainfall amount values, an integrated value of the rainfall attenuation amounts, and a difference between the first and second radar rainfall amount values.

(7)

The information processing apparatus according to any one of (1) to (6), wherein the processing circuitry is configured to:

acquire forecast data in the first time zone including a forecast value in the first time zone regarding a plurality of meteorological elements provided by an external apparatus different from the information processing apparatus, acquire the plurality of first feature values based on the first and second weather data in the first time zone and the forecast data in the first time zone, acquire forecast data in the second time zone including a forecast value in the second time zone regarding the plurality of meteorological elements provided by the external apparatus, and acquire the plurality of second feature values based on the first and second weather data in the second time zone and the forecast data in the second time zone.

(8)

The information processing apparatus according to (7), wherein the forecast data includes at least one forecast value among an air temperature on a ground surface, a sea surface calibration atmospheric pressure on the ground surface, a wind speed on the ground surface, a cloud amount on the ground surface, an ascending air current on each atmospheric pressure surface, an air temperature on each atmospheric pressure surface, a wind speed on each atmospheric pressure surface, and a relative humidity on each atmospheric pressure surface.

(9)

The information processing apparatus according to any one of (1) to (8), wherein the processing circuitry is configured to:

generate a plurality of first learned models based on first learning data generated while changing a combination of the plurality of first feature values, evaluate the plurality of generated first learned models using a part of the generated first learning data or evaluation data corresponding to the first learning data, select a third feature value, which is a part or all of the plurality of first feature values, based on a result obtained by evaluating the first learned models, generate a second learned model based on second learning data generated based on the ground rainfall amount value included in the ground rainfall amount data in the first time zone and the selected third feature value, acquire a fourth feature value corresponding to the third feature value among the plurality of second feature values based on the first and second weather data in the second time zone, and acquire a parameter output from the second learned model by inputting the acquired fourth feature value to the generated second learned model.

(10)

The information processing apparatus according to any one of (1) to (9), wherein external rainfall amount data is used instead of the second weather data, the external rainfall amount data including a composite rainfall amount value obtained by composing the second radar rainfall amount value observed by the second weather radar and a third radar rainfall amount value observed by a third weather radar different from the first and second weather radars.

(11)

The information processing apparatus according to any one of (1) to (10), wherein the composite rainfall amount data is data in which a composite rainfall amount value obtained by composing the first and second radar rainfall amount values is assigned to each coordinate point in a three-dimensional coordinate space.

(12)

A radar apparatus corresponding to the first or second weather radar including the information processing apparatus according to any one of (1) to (11).

(13)

A method including:

acquiring first weather data in a first time zone including a first radar rainfall amount value observed in the first time zone in a first weather radar, second weather data in the first time zone including a second radar rainfall amount value observed in the first time zone in a second weather radar different from the first weather radar, and ground rainfall amount data in the first time zone including a ground rainfall amount value measured in the first time zone in a ground rainfall meter;

acquiring, based on the first and second weather data in the first time zone, a plurality of first feature values related to accuracy of the first and second radar rainfall amount values included in the first and second weather data in the first time zone;

generating learning data based on the ground rainfall amount value included in the ground rainfall amount data in the first time zone and the plurality of acquired first feature values;

generating, based on the generated learning data, a learned model learned so as to output a parameter for estimating a rainfall amount value corresponding to the ground rainfall amount value included in the ground rainfall amount data in the first time zone when the plurality of first feature values are input;

acquiring first weather data in a second time zone including a first radar rainfall amount value observed in the second time zone after the first time zone in the first weather radar and second weather data in the second time zone including a second radar rainfall amount value observed in the second time zone in the second weather radar;

acquiring, based on the first and second weather data in the second time zone, a plurality of second feature values related to accuracy of the first and second radar rainfall amount values included in the first and second weather data in the second time zone;

acquiring a parameter output from the learned model by inputting the plurality of acquired second feature values to the generated learned model; and composing, based on the acquired parameter, the first and second radar rainfall amount values included in the first and second weather data in the second time zone to generate composite rainfall amount data.

(14)

A non-transitory computer-readable storage medium having stored thereon a program which is executed by a computer of an information processing apparatus, the program including instructions capable of causing the computer to execute functions of:

acquiring first weather data in a first time zone including a first radar rainfall amount value observed in the first time zone in a first weather radar, second weather data in the first time zone including a second radar rainfall amount value observed in the first time zone in a second weather radar different from the first weather radar, and ground rainfall amount data in the first time zone including a ground rainfall amount value measured in the first time zone in a ground rainfall meter;

acquiring, based on the first and second weather data in the first time zone, a plurality of first feature values related to accuracy of the first and second radar rainfall amount values included in the first and second weather data in the first time zone;

generating learning data based on the ground rainfall amount value included in the ground rainfall amount data in the first time zone and the plurality of acquired first feature values;

generating, based on the generated learning data, a learned model learned so as to output a parameter for estimating a rainfall amount value corresponding to the ground rainfall amount value included in the ground rainfall amount data in the first time zone when the plurality of first feature values are input;

acquiring first weather data in a second time zone including a first radar rainfall amount value observed in the second time zone after the first time zone in the first weather radar and second weather data in the second time zone including a second radar rainfall amount value observed in the second time zone in the second weather radar;

acquiring, based on the first and second weather data in the second time zone, a plurality of second feature values related to accuracy of the first and second radar rainfall amount values included in the first and second weather data in the second time zone;

acquiring a parameter output from the learned model by inputting the plurality of acquired second feature values to the generated learned model; and composing, based on the acquired parameter, the first and second radar rainfall amount values included in the first and second weather data in the second time zone to generate composite rainfall amount data.

What is claimed is:

1. An information processing apparatus comprising:

a processing circuitry comprising at least one of (i) one or more hardware processors executing instructions stored in a computer-readable memory, or (ii) dedicated hardware, the processing circuitry being configured to:

acquire (i) first weather data in a first time zone including a first radar rainfall amount value observed in the first time zone at a first observation point by a first weather radar, the first radar rainfall amount value calculated based on a reflected wave of a radio wave transmitted from the first weather radar, the first weather data including, in addition to the first radar rainfall amount value, at least one observation point data item acquired from the first weather radar, the at least one observation point data item including at least one of reception power, a reflectivity factor, a Doppler velocity, a Doppler spectrum width, a differential reflectivity, a correlation coefficient between polarizations, a differential phase, a specific differential phase, a flag value indicating a calculation method of the first radar rainfall amount value, or an integrated value of a rainfall attenuation amount at the first observation point, (ii) second weather data in the first time zone including a second radar rainfall amount value observed in the first time zone at a second observation point by a second weather radar different from the first weather radar, the second radar rainfall amount value calculated based on a reflected wave of a radio wave transmitted from the second weather radar, the second weather data including, in addition to the second radar rainfall amount value, at least one observation point data item acquired from the second weather radar, the at least one observation point data item acquired from the second weather radar including at least one of reception power, a reflectivity factor, a Doppler velocity, a Doppler spectrum width, a differential reflectivity, a correlation coefficient between polarizations, a differential phase, a specific differential phase, a flag value indicating a calculation method of the second radar rainfall amount value, or an integrated value of a rainfall attenuation amount at the second observation point, and (ii) ground rainfall amount data in the first time zone including a ground rainfall amount value measured in the first time zone in a ground rainfall meter;

derive, based on the first and second weather data in the first time zone, a plurality of first feature values related to accuracy of the first and second radar rainfall amount values included in the first and second weather data in the first time zone, the plurality of first feature values including at least the first and second radar rainfall amount values, a distance from the first and second weather radars to the first and second observation points, a flag value indicating a calculation method of the first and second radar rainfall amount values, an integrated value of the rainfall attenuation amounts, and a difference between the first and second radar rainfall amount values;

generate first learning data sets, each based on the ground rainfall amount value included in the ground rainfall amount data in the first time zone and a corresponding combination of the plurality of first feature values;

generate, based on the generated first learning data sets, a plurality of first learned models while varying combinations of the first feature values, the plurality of first learned models being trained to output a parameter for estimating a rainfall amount value corresponding to the ground rainfall amount value included in the ground rainfall amount data in the first time zone when the corresponding combination of first feature values is input;

evaluate the generated first learned models using a part of the generated first learning data sets or evaluation data corresponding thereto by calculating an index relating to a correlation between an estimated rainfall amount value obtained using each of the first learned models and the ground rainfall amount value, and select a third feature value set comprising all or a subset of the first feature values, based on the calculated indices;

generate a second learned model based on second learning data generated based on the ground rainfall amount value included in the ground rainfall amount data in the first time zone and the selected third feature value set;

acquire (i) first weather data in a second time zone which is after the first time zone, the first weather data in the second time zone including a first radar rainfall amount value observed in the second time zone at each of a plurality of first observation points by the first weather radar, and (ii) second weather data in the second time zone including a second radar rainfall amount value observed in the second time zone at each of a plurality of second observation points by the second weather radar;

convert the first and second weather data in the second time zone at each of the plurality of first and second observation points into data corresponding to a coordinate system defined for composite rainfall amount data;

derive, based on the converted first and second weather data in the second time zone, a plurality of second feature values related to accuracy of the first and second radar rainfall amount values included in the first and second weather data in the second time zone, the plurality of second feature values corresponding to the first feature values constituting the selected third feature value set;

input the plurality of second feature values into the second learned model to obtain a parameter output from the second learned model; and compose, based on the parameter output by the second learned model, the first and second radar rainfall amount values included in the first and second weather data in the second time zone to generate the composite rainfall amount data, the parameter controlling contributions of the first and second radar rainfall amounts in the second time zone in the generated composite rainfall amount data on a per-coordinate-point basis with respect to each coordinate point in the coordinate system defined for the composite rainfall amount data.

2. The information processing apparatus according to claim 1, wherein the second learning data includes the selected third feature value set and identification information for identifying the first or second weather radar that has observed a radar rainfall amount value close to the ground rainfall amount value included in the ground rainfall amount data in the first time zone, the second learned model performs learning so as to output the identification information as the parameter when the selected third feature value set is input, and the composite rainfall amount data includes the first or second radar rainfall amount value observed in the second time zone by the first or second weather radar identified by the identification information output as the parameter from the second learned model when the second feature values are input.

3. The information processing apparatus according to claim 1, wherein the second learning data includes the selected third feature value set and identification information for identifying the first or second weather radar that has observed a radar rainfall amount value close to the ground rainfall amount value included in the ground rainfall amount data in the first time zone, the second learned model performs learning so as to output, for each of the first and second weather radars, a probability of observing the radar rainfall amount value close to the ground rainfall amount value as the parameter when the third feature value set is input, and the composite rainfall amount data is generated by composing the first and second radar rainfall amount values included in the first and second weather data in the second time zone with a probability output for each of the first and second weather radars as the parameter from the second learned model when the second feature values are input as a weight.

4. The information processing apparatus according to claim 1, wherein the second learning data includes the selected third feature value set and the ground rainfall amount value included in the ground rainfall amount data in the first time zone, the second learned model performs learning so as to output an estimated rainfall amount value corresponding to the ground rainfall amount value as the parameter when the third feature value set is input, and the composite rainfall amount data includes an estimated rainfall amount value which is output as the parameter from the second learned model when the second feature values are input.

5. The information processing apparatus according to claim 1, wherein the processing circuitry is configured to:

acquire forecast data in the first time zone including a forecast value in the first time zone regarding a plurality of meteorological elements provided by an external apparatus different from the information processing apparatus, acquire the first feature values based on the first and second weather data in the first time zone and the forecast data in the first time zone, acquire forecast data in the second time zone including a forecast value in the second time zone regarding the meteorological elements provided by the external apparatus, and acquire the second feature values based on the first and second weather data in the second time zone and the forecast data in the second time zone.

6. The information processing apparatus according to claim 5, wherein the forecast data includes at least one forecast value among an air temperature on a ground surface, a sea surface calibration atmospheric pressure on the ground surface, a wind speed on the ground surface, a cloud amount on the ground surface, an ascending air current on each atmospheric pressure surface, an air temperature on each atmospheric pressure surface, a wind speed on each atmospheric pressure surface, and a relative humidity on each atmospheric pressure surface.

7. The information processing apparatus according to claim 1, wherein the second weather data comprises external rainfall amount data including a composite rainfall amount value obtained by composing the second radar rainfall amount value observed by the second weather radar and a third radar rainfall amount value observed by a third weather radar different from the first and second weather radars.

8. The information processing apparatus according to claim 1, wherein the coordinate system is a three-dimensional coordinate space, and the composite rainfall amount data is data in which a composite rainfall amount value obtained by composing the first and second radar rainfall amount values in the second time zone in accordance with the parameter output by the second learned model is assigned to each coordinate point in the three-dimensional coordinate space.

9. A radar apparatus comprising:

the information processing apparatus according to claim 1, and one of the first weather radar or the second weather radar.

10. The information processing apparatus according to claim 1, wherein the processing circuitry generates the second learned model by applying a gradient boosting decision tree algorithm to the second learning data, and wherein the processing circuitry is further configured to display the composite rainfall amount data on a map by color-coding rainfall amount values assigned to the coordinate points.

11. The information processing apparatus according to claim 1, wherein, in evaluating the plurality of first learned models, the processing circuitry is configured to generate composite rainfall amount data using the estimated rainfall amount each of the first models, calculate, as the index, a root mean square error (RMSE) between the composite rainfall amount data and the ground rainfall amount value included in the ground rainfall amount data as a true value, and select the third feature value set based on the RMSE calculated with respect to the composite rainfall amount data generated by each of the first models.

12. The information processing apparatus according to claim 1, wherein the processing circuitry is configured to convert the first and second weather data acquired for each observation point of the first and second weather radars in the first time zone into data for coordinate points in the coordinate system defined for the composite rainfall amount data, and to derive the first feature values for each coordinate point based on the converted data, including generating at least one new feature value by calculating a difference between the first radar rainfall amount value and the second radar rainfall amount value corresponding to the same coordinate point.

13. A method executed by processing circuitry comprising at least one of (i) one or more hardware processors executing instructions stored in a computer-readable memory, or (ii) dedicated hardware, the method comprising:

acquiring (i) first weather data in a first time zone including a first radar rainfall amount value observed in the first time zone at a first observation point by a first weather radar, the first radar rainfall amount value calculated based on a reflected wave of a radio wave transmitted from the first weather radar, the first weather data including, in addition to the first radar rainfall amount value, at least one observation point data item acquired from the first weather radar, the at least one observation point data item including at least one of reception power, a reflectivity factor, a Doppler velocity, a Doppler spectrum width, a differential reflectivity, a correlation coefficient between polarizations, a differential phase, a specific differential phase, a flag value indicating a calculation method of the first radar rainfall amount value, or an integrated value of a rainfall attenuation amount at the first observation point, (ii) second weather data in the first time zone including a second radar rainfall amount value observed in the first time zone at a second observation point by a second weather radar different from the first weather radar, the second radar rainfall amount value calculated based on a reflected wave of a radio wave transmitted from the second weather radar, the second weather data including, in addition to the second radar rainfall amount value, at least one observation point data item acquired from the second weather radar, the at least one observation point data item acquired from the second weather radar including at least one of reception power, a reflectivity factor, a Doppler velocity, a Doppler spectrum width, a differential reflectivity, a correlation coefficient between polarizations, a differential phase, a specific differential phase, a flag value indicating a calculation method of the second radar rainfall amount value, or an integrated value of a rainfall attenuation amount at the second observation point, and (ii) ground rainfall amount data in the first time zone including a ground rainfall amount value measured in the first time zone in a ground rainfall meter;

deriving, based on the first and second weather data in the first time zone, a plurality of first feature values related to accuracy of the first and second radar rainfall amount values included in the first and second weather data in the first time zone, the plurality of first feature values including at least the first and second radar rainfall amount values, a distance from the first and second weather radars to the first and second observation points, a flag value indicating a calculation method of the first and second radar rainfall amount values, an integrated value of the rainfall attenuation amounts, and a difference between the first and second radar rainfall amount values;

generating first learning data sets, each based on the ground rainfall amount value included in the ground rainfall amount data in the first time zone and a corresponding combination of the plurality of first feature values;

generating, based on the generated first learning data sets, a plurality of first learned models while varying combinations of the first feature values, the plurality of first learned models being trained to output a parameter for estimating a rainfall amount value corresponding to the ground rainfall amount value included in the ground rainfall amount data in the first time zone when the corresponding combination of first feature values is input;

evaluating the generated first learned models using a part of the generated first learning data sets or evaluation data corresponding thereto by calculating an index relating to a correlation between an estimated rainfall amount value obtained using each of the first learned models and the ground rainfall amount value, and selecting a third feature value set comprising all or a subset of the first feature values, based on the calculated indices;

generating a second learned model based on second learning data generated based on the ground rainfall amount value included in the ground rainfall amount data in the first time zone and the selected third feature value set;

acquiring (i) first weather data in a second time zone which is after the first time zone, the first weather data in the second time zone including a first radar rainfall amount value observed in the second time zone at each of a plurality of first observation points by the first weather radar, and (ii) second weather data in the second time zone including a second radar rainfall amount value observed in the second time zone at each of a plurality of second observation points by the second weather radar;

converting the first and second weather data in the second time zone at each of the plurality of first and second observation points into data corresponding to a coordinate system defined for composite rainfall amount data;

deriving, based on the converted first and second weather data in the second time zone, a plurality of second feature values related to accuracy of the first and second radar rainfall amount values included in the first and second weather data in the second time zone, the plurality of second feature values corresponding to the first feature values constituting the selected third feature value set;

inputting the plurality of second feature values into the second learned model to obtain a parameter output from the second learned model; and composing, based on the parameter output by the second learned model, the first and second radar rainfall amount values included in the first and second weather data in the second time zone to generate the composite rainfall amount data, the parameter controlling contributions of the first and second radar rainfall amounts in the second time zone in the generated composite rainfall amount data on a per-coordinate-point basis with respect to each coordinate point in the coordinate system defined for the composite rainfall amount data.

14. A non-transitory computer-readable storage medium having stored thereon a program which is executable by a computer of an information processing apparatus, the program comprising instructions capable of causing the computer to execute functions of:

acquiring (i) first weather data in a first time zone including a first radar rainfall amount value observed in the first time zone at a first observation point by a first weather radar, the first radar rainfall amount value calculated based on a reflected wave of a radio wave transmitted from the first weather radar, the first weather data including, in addition to the first radar rainfall amount value, at least one observation point data item acquired from the first weather radar, the at least one observation point data item including at least one of reception power, a reflectivity factor, a Doppler velocity, a Doppler spectrum width, a differential reflectivity, a correlation coefficient between polarizations, a differential phase, a specific differential phase, a flag value indicating a calculation method of the first radar rainfall amount value, or an integrated value of a rainfall attenuation amount at the first observation point, (ii) second weather data in the first time zone including a second radar rainfall amount value observed in the first time zone at a second observation point by a second weather radar different from the first weather radar, the second radar rainfall amount value calculated based on a reflected wave of a radio wave transmitted from the second weather radar, the second weather data including, in addition to the second radar rainfall amount value, at least one observation point data item acquired from the second weather radar, the at least one observation point data item acquired from the second weather radar including at least one of reception power, a reflectivity factor, a Doppler velocity, a Doppler spectrum width, a differential reflectivity, a correlation coefficient between polarizations, a differential phase, a specific differential phase, a flag value indicating a calculation method of the second radar rainfall amount value, or an integrated value of a rainfall attenuation amount at the second observation point, and (iii) ground rainfall amount data in the first time zone including a ground rainfall amount value measured in the first time zone in a ground rainfall meter;

deriving, based on the first and second weather data in the first time zone, a plurality of first feature values related to accuracy of the first and second radar rainfall amount values included in the first and second weather data in the first time zone, the plurality of first feature values including at least the first and second radar rainfall amount values, a distance from the first and second weather radars to the first and second observation points, a flag value indicating a calculation method of the first and second radar rainfall amount values, an integrated value of the rainfall attenuation amounts, and a difference between the first and second radar rainfall amount values;

generating first learning data sets, each based on the ground rainfall amount value included in the ground rainfall amount data in the first time zone and a corresponding combination of the plurality of first feature values;

generating, based on the generated first learning data sets, a plurality of first learned models while varying combinations of the first feature values, the plurality of first learned models being trained to output a parameter for estimating a rainfall amount value corresponding to the ground rainfall amount value included in the ground rainfall amount data in the first time zone when the corresponding combination of first feature values is input;

evaluating the generated first learned models using a part of the generated first learning data sets or evaluation data corresponding thereto by calculating an index relating to a correlation between an estimated rainfall amount value obtained using each of the first learned models and the ground rainfall amount value, and selecting a third feature value set comprising all or a subset of the first feature values, based on the calculated indices;

generating a second learned model based on second learning data generated based on the ground rainfall amount value included in the ground rainfall amount data in the first time zone and the selected third feature value set;

acquiring (ii) first weather data in a second time zone which is after the first time zone, the first weather data in the second time zone including a first radar rainfall amount value observed in the second time zone at each of a plurality of first observation points by the first weather radar, and (ii) second weather data in the second time zone including a second radar rainfall amount value observed in the second time zone at each of a plurality of second observation points by the second weather radar;

converting the first and second weather data in the second time zone at each of the plurality of first and second observation points into data corresponding to a coordinate system defined for composite rainfall amount data;

deriving, based on the converted first and second weather data in the second time zone, a plurality of second feature values related to accuracy of the first and second radar rainfall amount values included in the first and second weather data in the second time zone, the plurality of second feature values corresponding to the first feature values constituting the selected third feature value set;

inputting the plurality of second feature values into the second learned model to obtain a parameter output from the second learned model;

composing, based on the parameter output by the second learned model, the first and second radar rainfall amount values included in the first and second weather data in the second time zone to generate the composite rainfall amount data, the parameter controlling contributions of the first and second radar rainfall amounts in the second time zone in the generated composite rainfall amount data on a per-coordinate-point basis with respect to each coordinate point in the coordinate system defined for the composite rainfall amount data.

* * * * *